United States Patent
Choi et al.

(10) Patent No.: US 11,929,806 B2
(45) Date of Patent: Mar. 12, 2024

(54) METHOD FOR REPORTING MULTIPLE CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Kukheon Choi, Seoul (KR); Jiwon Kang, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 563 days.

(21) Appl. No.: 17/262,101

(22) PCT Filed: Jul. 22, 2019

(86) PCT No.: PCT/KR2019/009008
§ 371 (c)(1),
(2) Date: Jan. 21, 2021

(87) PCT Pub. No.: WO2020/022720
PCT Pub. Date: Jan. 30, 2020

(65) Prior Publication Data
US 2021/0320703 A1    Oct. 14, 2021

(30) Foreign Application Priority Data

Jul. 24, 2018  (KR) .................. 10-2018-0085688
Jul. 27, 2018  (KR) .................. 10-2018-0088209

(51) Int. Cl.
*H04B 7/06* (2006.01)
*H04B 7/024* (2017.01)
*H04L 5/00* (2006.01)

(52) U.S. Cl.
CPC ........... *H04B 7/0626* (2013.01); *H04B 7/024* (2013.01); *H04B 7/0636* (2013.01); *H04L 5/0048* (2013.01)

(58) Field of Classification Search
CPC .... H04B 7/0626; H04B 7/024; H04B 7/0636; H04B 7/0639; H04L 5/0048; H04L 5/0094; H04L 5/0057
See application file for complete search history.

(56) References Cited

U.S. PATENT DOCUMENTS

2010/0104033 A1   4/2010  Gorokhov
2013/0010889 A1   1/2013  Ponnampalam
(Continued)

FOREIGN PATENT DOCUMENTS

| KR | 10-2012-0093027 | 8/2012 | |
| KR | 10-2015-0009980 | 1/2015 | |
| WO | WO-2017155634 A1 * | 9/2017 | ........... A61B 5/0507 |

OTHER PUBLICATIONS

ZTE, Enhancement to CSI feedback, R1-1712315, 3GPP TSG RAN WG1 Meeting #90, Prague, Czechi, Aug. 12, 2017, See pp. 1-4.

*Primary Examiner* — Chae S Lee
(74) *Attorney, Agent, or Firm* — BRYAN CAVE LEIGHTON PAISNER LLP

(57) ABSTRACT

According to an embodiment of the disclosure, a method for reporting a plurality of channel state information by a user equipment (UE) in a wireless communication system comprises receiving association information related to a plurality of channel state reports and reporting a plurality of channel state information using the association information, wherein in reporting the plurality of channel state information, remaining channel state information except for specific channel state information among the plurality of channel (Continued)

state information is excluded from being reported or is reported in a form of a reduced payload size, according to the association information.

14 Claims, 16 Drawing Sheets

(56) References Cited

U.S. PATENT DOCUMENTS

| | | | | |
|---|---|---|---|---|
| 2013/0258954 A1* | 10/2013 | Khoshnevis | .......... | H04L 1/0027 |
| | | | | 370/329 |
| 2015/0382222 A1* | 12/2015 | Park | .................. | H04W 74/006 |
| | | | | 370/252 |
| 2016/0134408 A1* | 5/2016 | Kim | .................... | H04L 5/0048 |
| | | | | 370/329 |
| 2019/0149285 A1* | 5/2019 | Tsai | .................... | H04W 72/56 |
| | | | | 370/329 |
| 2021/0211225 A1* | 7/2021 | Yuan | .................... | H04L 5/0057 |
| 2023/0125259 A1* | 4/2023 | Marinier | ............... | H04B 7/024 |
| | | | | 375/219 |

* cited by examiner

[FIG. 1]
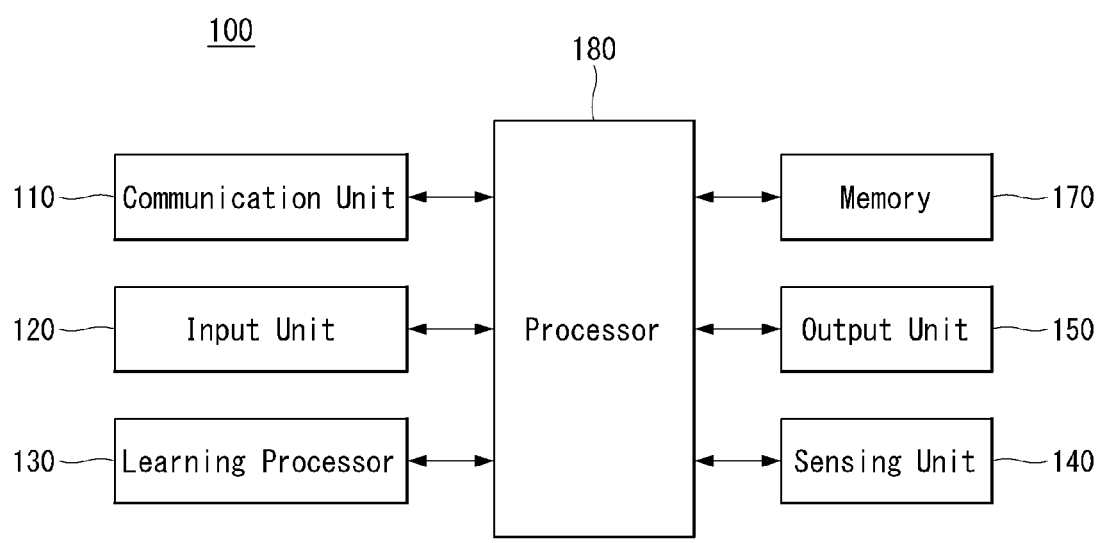

[FIG. 2]
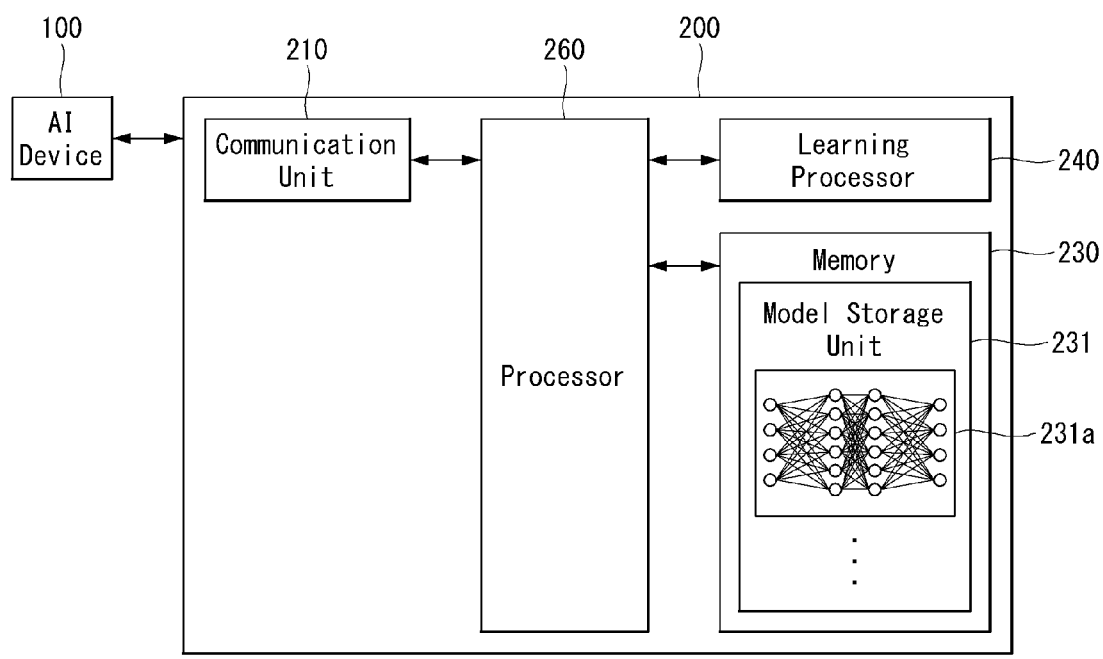

[FIG. 3]
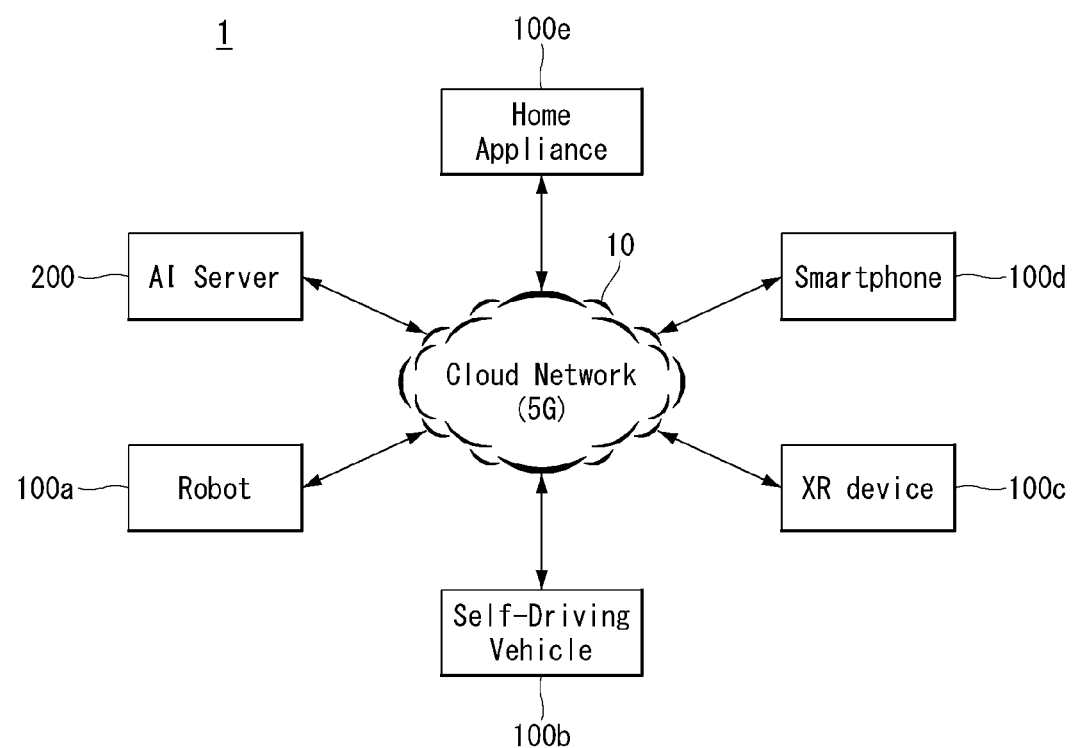

[FIG. 4]
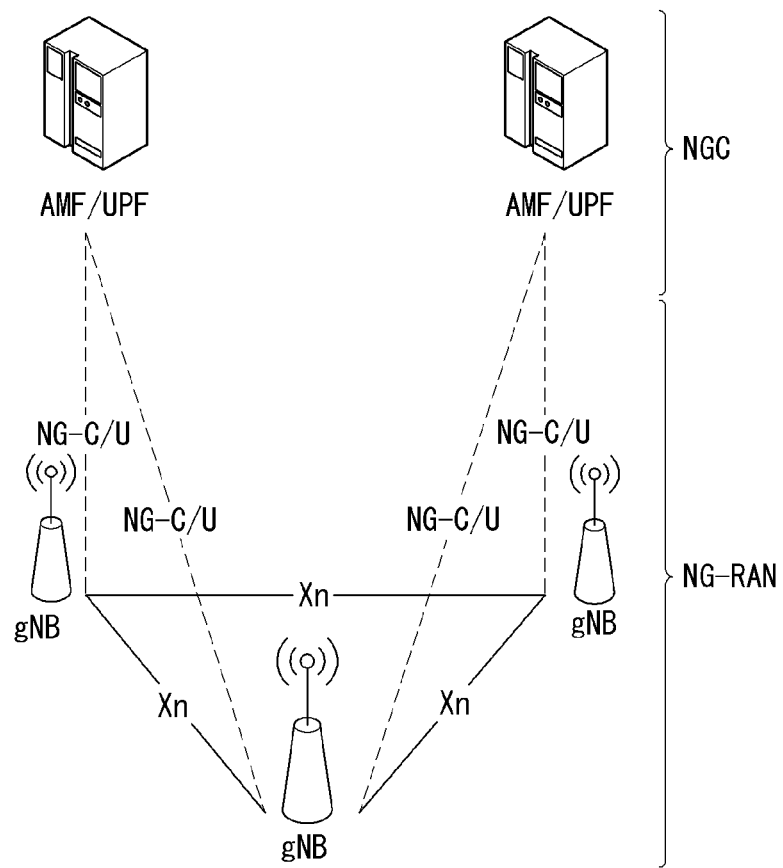

[FIG. 5]
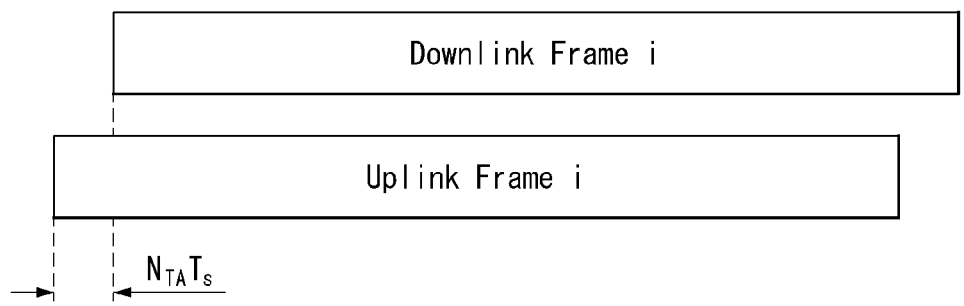

[FIG. 6]
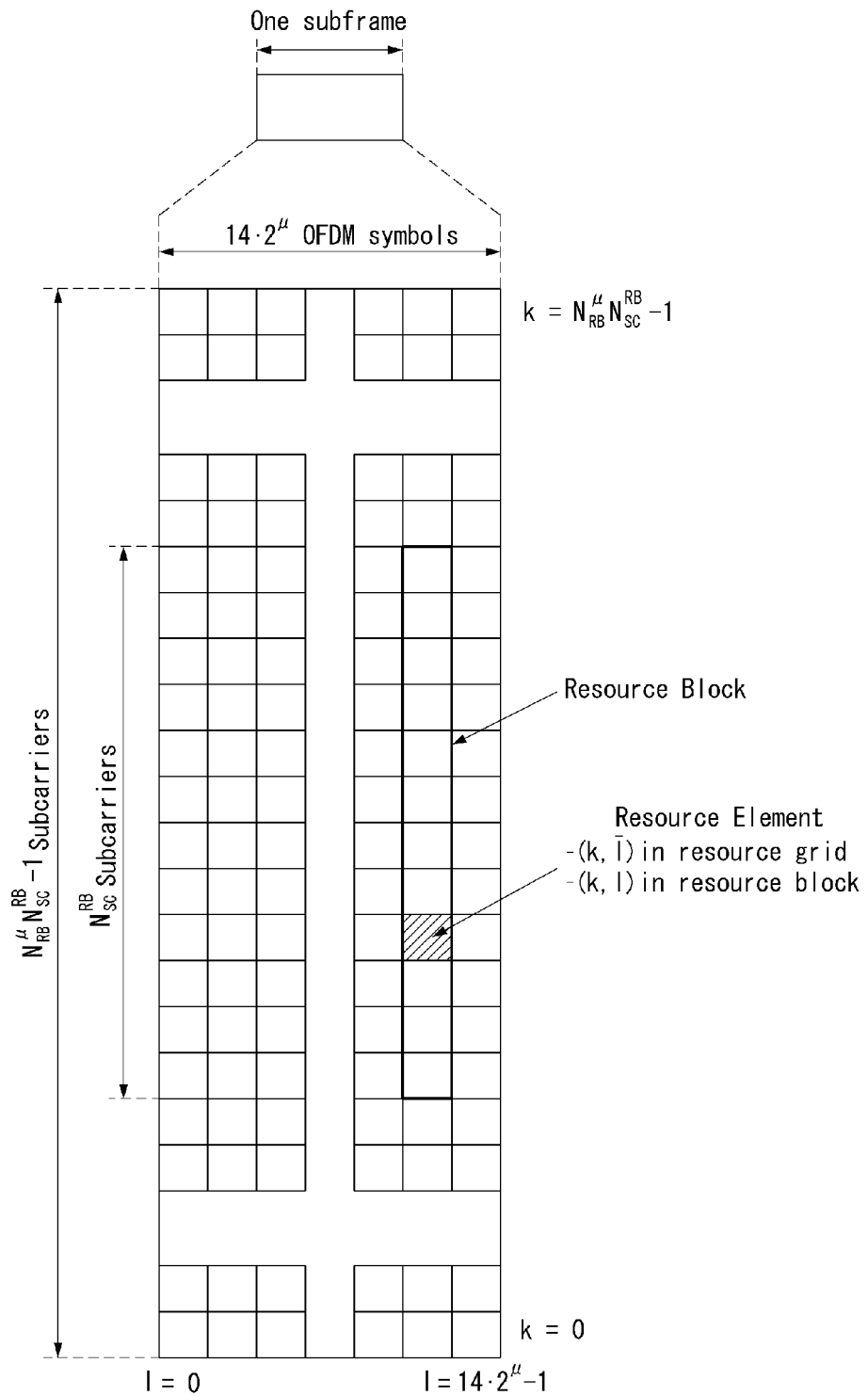

[FIG. 7]

| Material | Optical Property |
|---|---|
| liquid water | high absorption ($\alpha \approx 250$ cm$^{-1}$ at 1 THz) |
| metal | high reflectivity (>99.5% at 1 THz) |
| plastic | low absorption ($\alpha < 0.5$ cm$^{-1}$ at 1 THz) low refractive index (n$\approx$1.5) |
| semiconductor | low absorption ($\alpha < 1$ cm$^{-1}$ at 1 THz) high refractive index (n~3-4) |

[FIG. 8]
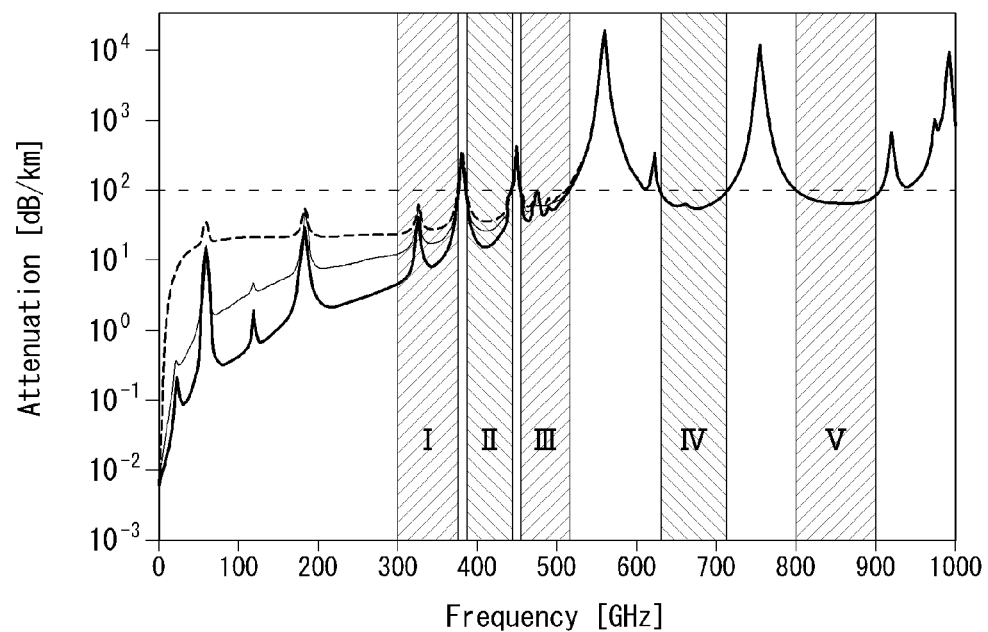
(a)
| Window # | Bandwidth [GHz] | Center Frequency [GHz] |
|---|---|---|
| I | 76 | 338 |
| II | 58 | 414 |
| III | 62 | 484 |
| IV | 85 | 669 |
| V | 94 | 855 |
(b)

[FIG. 9]
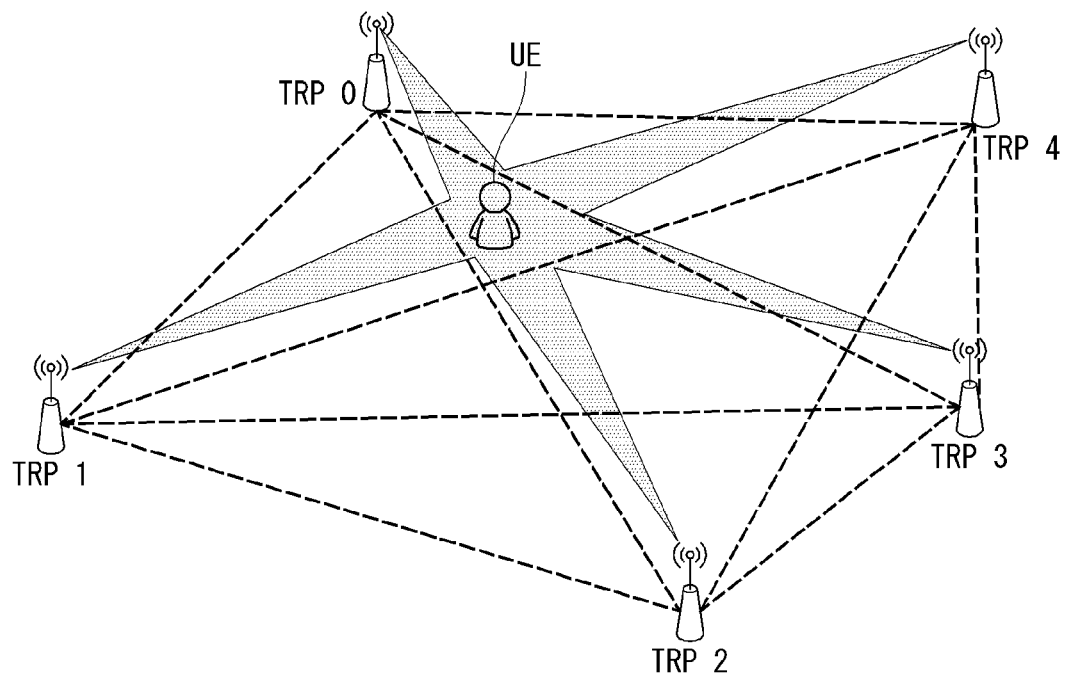

[FIG. 10]
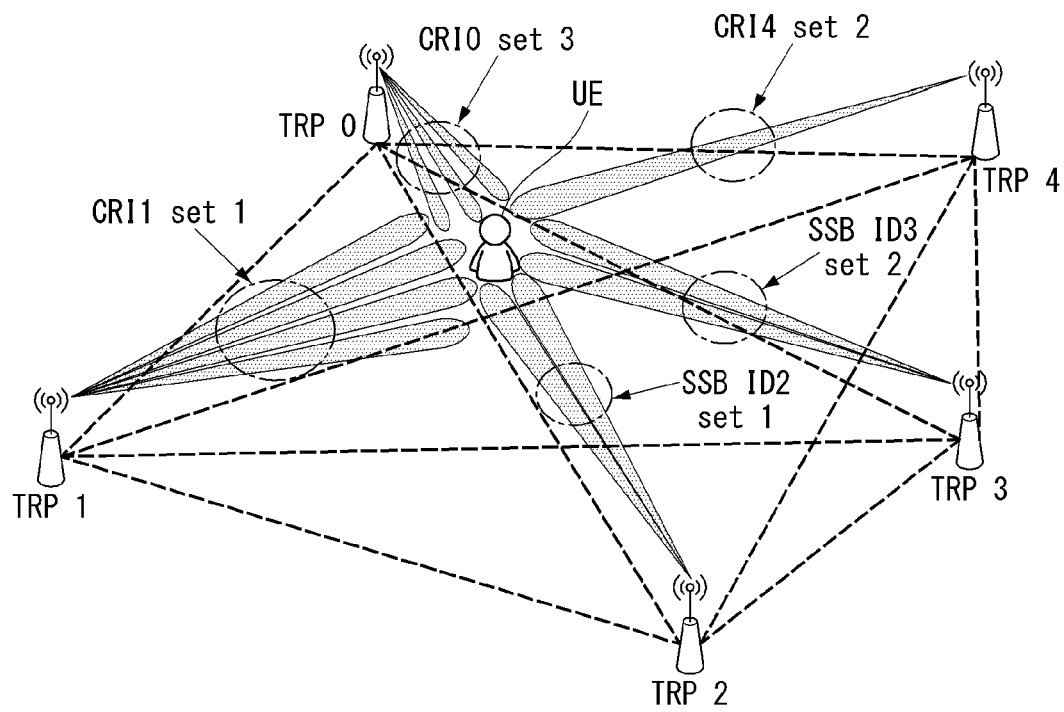

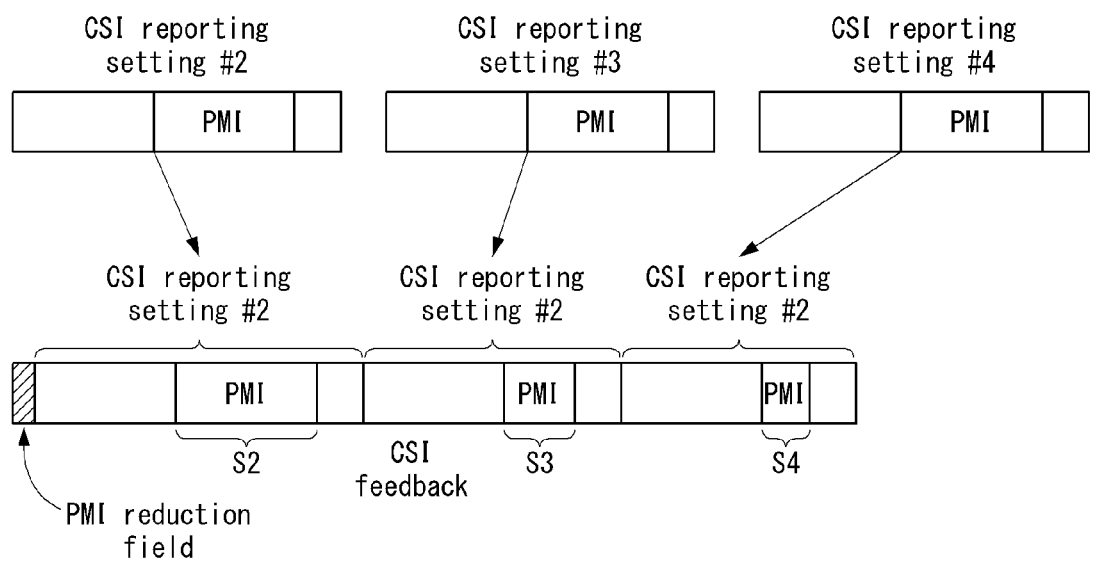
[FIG. 11]

[FIG. 12]
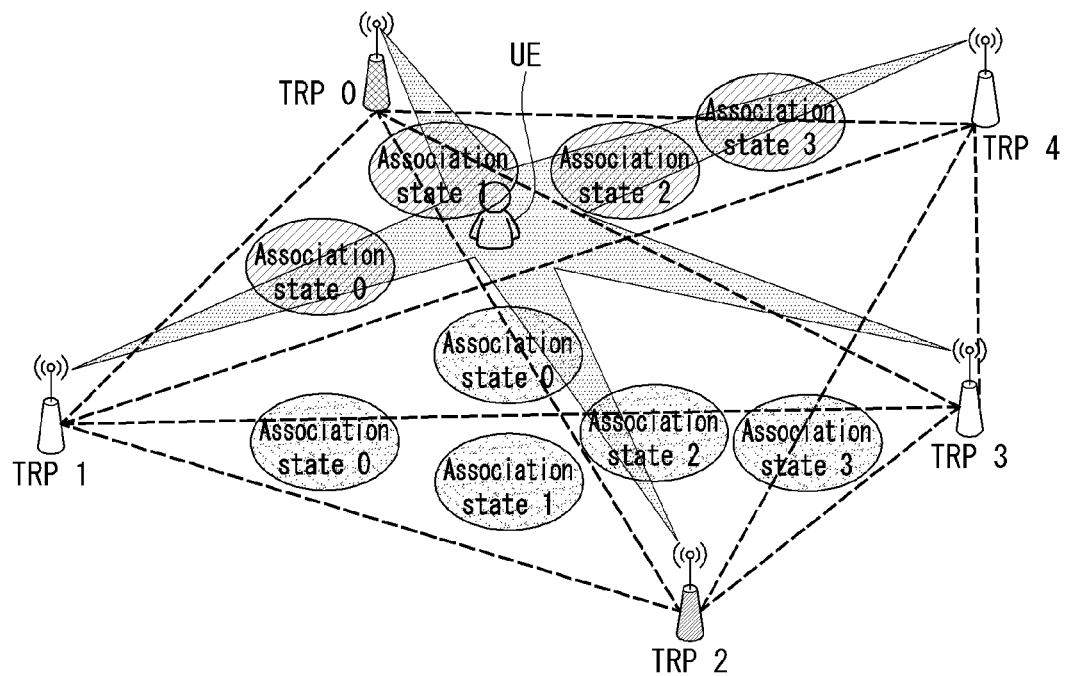

[FIG. 13]
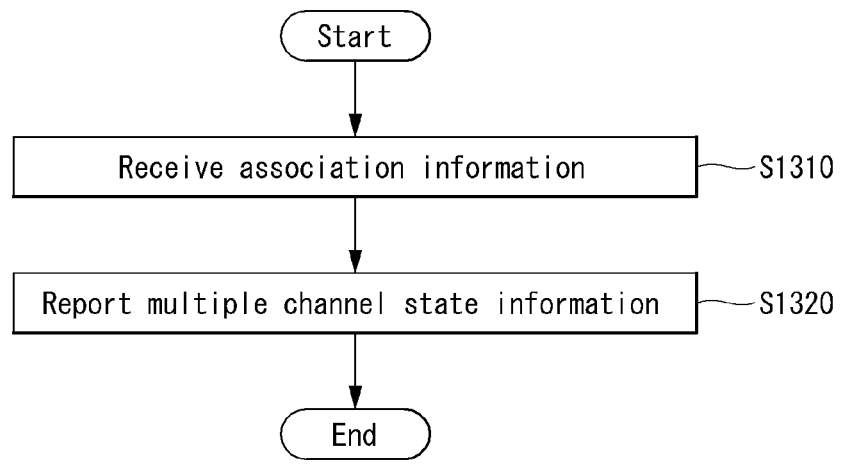

[FIG. 14]
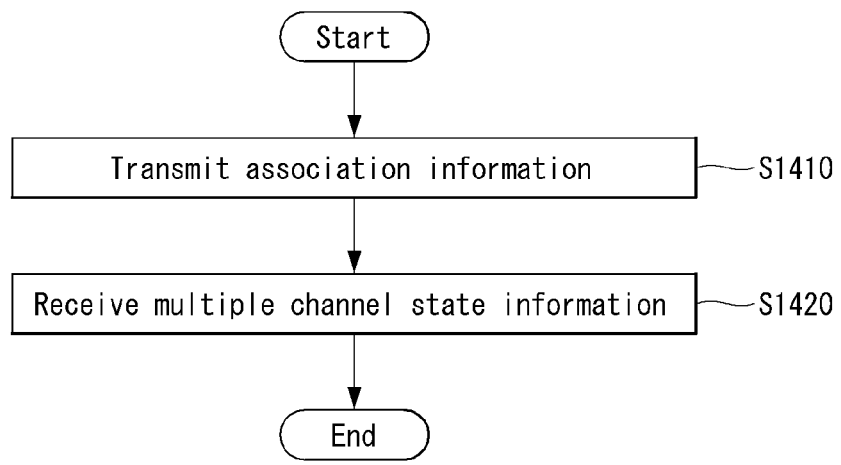

[FIG. 15]
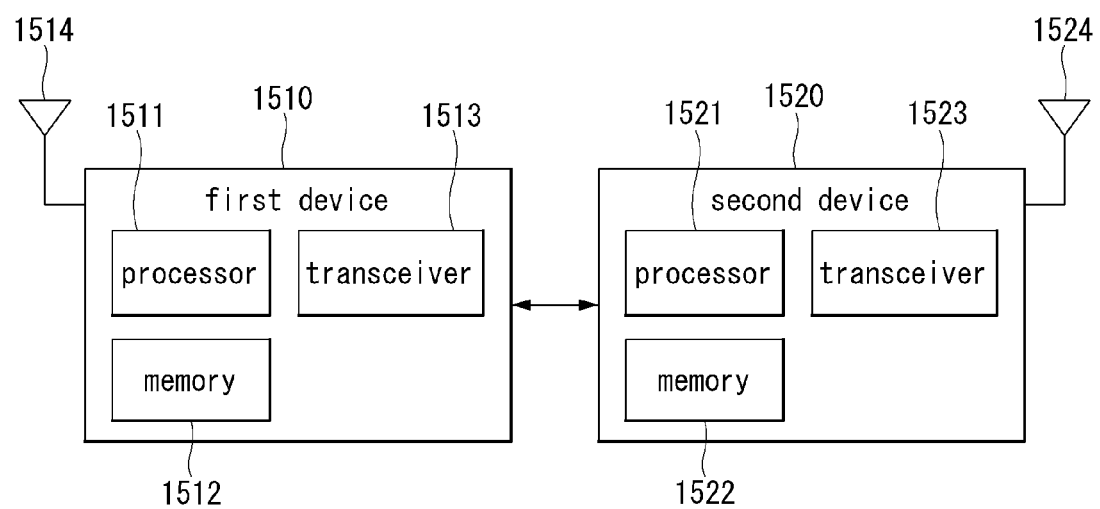

[FIG. 16]
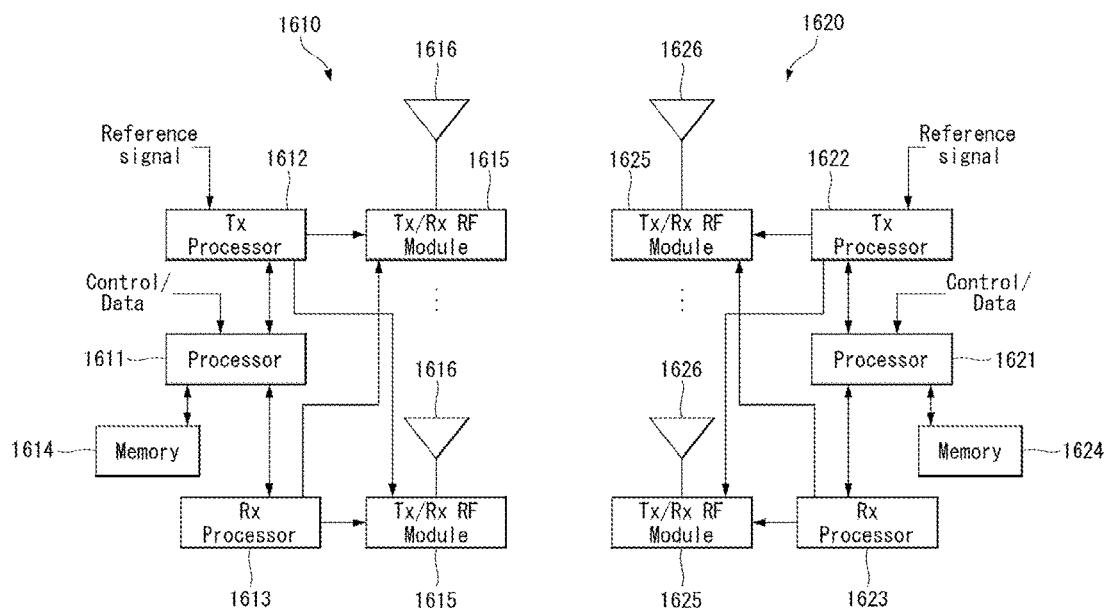

METHOD FOR REPORTING MULTIPLE CHANNEL STATE INFORMATION IN WIRELESS COMMUNICATION SYSTEM AND APPARATUS THEREFOR

This application is the National Stage filing under 35 U.S.C. 371 of International Application No. PCT/KR2019/009008, filed on Jul. 22, 2019, which claims the benefit of KR Application No. 10-2018-0085688, filed on Jul. 24, 2018, No. 10-2018-0088209, filed on Jul. 27, 2018, the contents of which are all hereby incorporated by reference herein in their entirety.

TECHNICAL FIELD

The disclosure relates to methods and devices for reporting a plurality of channel state information in a wireless communication system.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DETAILED DESCRIPTION OF THE DISCLOSURE

Technical Problem

An object of the disclosure is to reduce feedback of channel state information considering the characteristics of a frequency band in which a wireless communication system operates.

Further, an object of the disclosure is to reduce feedback of channel state information considering a communication environment when a plurality of channel state information is to be reported.

Objects of the disclosure are not limited to the foregoing, and other unmentioned objects would be apparent to one of ordinary skill in the art from the following description.

Technical Solution

According to an embodiment of the disclosure, a method for reporting a plurality of channel state information by a user equipment (UE) in a wireless communication system comprises receiving association information related to a plurality of channel state reports and reporting a plurality of channel state information using the association information, wherein in reporting the plurality of channel state information, remaining channel state information except for specific channel state information among the plurality of channel state information is excluded from being reported or is reported in a form of a reduced payload size, according to the association information.

The wireless communication system operates in a specific frequency band, and wherein a lower limit of the specific frequency band is greater than or equal to 100 GHz.

The plurality of channel state information may be channel state information for a plurality of base stations included in a coordinated multiple-point transmission and reception (CoMP) set to perform CoMP or channel state information for a plurality of frequency regions.

The association information includes information indicating channel state information for remaining base stations according to channel state information for a specific base station among the plurality of base stations included in the CoMP set.

In receiving the association information, the association information is received from at least any one of the plurality of base stations included in the CoMP set.

In reporting the plurality of channel state information, when the channel state information for the specific base station and the channel state information for the remaining base stations are associated one-to-one in the association information, the channel state information for the remaining base stations is excluded from the reporting, and otherwise, the channel state information for the remaining base stations is reported in a form having a reduced payload size according to the association information.

The specific base station is any one of a base station transmitting a message for sending a request for channel state information to the UE, a base station set by RRC signaling, or a base station having a highest channel quality indicator (CQI) value among the plurality of base stations.

In the channel state information for the remaining base stations, at least one of a CSI-RS resource indicator (CRI) or a precoding matrix indicator (PMI) may have a reduced payload size according to the association information.

The payload size of the CRI included in the channel state information for the remaining base stations is determined according to a number of resources associated with CSI-RS resources for measuring the channel state information for the specific base station among CSI-RS resources for measuring the channel state information for the remaining base stations.

The payload size of the PMI included in the channel state information for the remaining base stations is determined by the number of the remaining precoding matrices except for the precoding matrices whose use is limited by the PMI included in the channel state information for the specific base station among the precoding matrices in the codebook.

The association information includes information indicating channel state information for remaining frequency regions according to channel state information for a specific frequency region among the plurality of frequency regions.

In reporting the plurality of channel state information, when the channel state information for the specific frequency region and the channel state information for the remaining frequency regions are associated one-to-one according to the association information, the channel state information for the remaining frequency regions is excluded from the reporting, and otherwise, the channel state information for the remaining frequency regions is reported in a form having a reduced payload size according to the association information.

The frequency region is a component carrier or a bandwidth part.

The association information indicates an association state determined according to UE-specific information including location information for the UE among preset association states. The determined association state includes information indicating a mapping relationship between information included in the specific channel state information and information included in the remaining channel state information.

According to another embodiment of the disclosure, a UE reporting a plurality of channel state information in a wireless communication system comprises a transceiver transmitting/receiving a radio signal, a memory, and a processor connected with the transceiver and the memory, wherein the processor receives association information related to a plurality of channel state reports and reports a plurality of channel state information according to the association information, and wherein remaining channel state information except for specific channel state information among the plurality of channel state information is configured to be excluded from being reported or to be reported in a form of a reduced payload size, according to the association information.

According to still another embodiment of the disclosure, a device reporting a plurality of channel states in a wireless communication system comprises a memory and a processor connected with the memory, wherein the processor receives association information related to a plurality of channel state reports and reports a plurality of channel state information using the association information, and wherein remaining channel state information except for specific channel state information among the plurality of channel state information is not reported or is reported in a form of a reduced payload size, according to the association information.

Advantageous Effects

The disclosure configures association information between channel state information considering the channel characteristics of a high frequency band. The remaining channel state information except for the specific channel state information serving as a reference among a plurality of channel state information may be excluded from the report using the association information. Therefore, it is possible to more effectively report channel state information in a terahertz communication environment with a small number of dominant rays.

Further, the disclosure may partially exclude the reporting of channel state information, or report the channel state information, with the payload size reduced, using the association between a plurality of base stations or the association between a plurality of frequency regions for performing coordinated multiple-point transmission and reception (CoMP). Therefore, it is possible to provide various association information that may reduce feedback of channel state information according to a communication environment.

Effects of the disclosure are not limited to the foregoing, and other unmentioned effects would be apparent to one of ordinary skill in the art from the following description.

BRIEF DESCRIPTION OF DRAWINGS

FIG. 1 illustrates an AI device 100 according to an embodiment of the disclosure.
FIG. 2 illustrates an AI server 200 according to an embodiment of the disclosure.
FIG. 3 illustrates an AI system 1 according to an embodiment of the disclosure.
FIG. 4 illustrates an example of an overall structure of a NR system to which a method proposed by the present specification is applicable.
FIG. 5 illustrates a relation between an uplink frame and a downlink frame in a wireless communication system to which a method proposed by the present specification is applicable.
FIG. 6 illustrates an example of a resource grid supported in a wireless communication system to which a method proposed by the present specification is applicable.
FIG. 7 is a view for describing the propagation characteristics of a terahertz (THz) signal according to various materials.
FIG. 8 is a view for describing an available bandwidth in a range of 1 terahertz (THz) considering path loss.
FIG. 9 is a view for describing reporting of channel state information when cooperative multi-point transmission/reception (CoMP) is performed in a terahertz environment according to an embodiment of the disclosure.
FIG. 10 is a view for describing reporting of channel state information considering resource association in a terahertz environment in which CoMP is performed according to an embodiment of the disclosure.
FIG. 11 is a view for describing a PMI reduction field according to an embodiment of the disclosure.
FIG. 12 is a view illustrating a method of reporting channel state information considering an association state according to an embodiment of the disclosure.
FIG. 13 is a flowchart illustrating a method for a terminal to report a plurality of channel state information according to an embodiment of the disclosure.
FIG. 14 is a flowchart illustrating a method for a base station to receive a plurality of channel state information according to another embodiment of the disclosure.
FIG. 15 is a view illustrating a wireless communication device to which the methods proposed in the disclosure may be applied according to another embodiment of the disclosure.
FIG. 16 is a block diagram illustrating a configuration of a wireless communication device to which the methods proposed in the disclosure are applicable.

MODE FOR CARRYING OUT THE DISCLOSURE

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The disclosure described below can be implemented by combining or modifying respective embodiments to meet the above-described requirements of 5G.

The following describes in detail technical fields to which the disclosure described below is applicable.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the disclosure.

Referring to FIG. 3, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100*a* to 100*e* to which the above-described technology is applied are described. In this case, the AI devices 100*a* to 100*e* shown in FIG. 3 may be considered to be detailed embodiments of the AI device 100 shown in FIG. 1.

AI+Robot to which the Disclosure can be Applied

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving to which the Disclosure can be Applied

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR to which the Disclosure can be Applied

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving to which the Disclosure can be Applied

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR to which the Disclosure can be Applied

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR to which the Disclosure can be Applied

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

System General

FIG. 4 illustrates an example of an overall structure of a new radio (NR) system to which a method proposed by the present specification is applicable.

Referring to FIG. 4, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s 1/ (\Delta f_{max} \cdot N_f)$, where $\Delta f_{max} = 480 \cdot 10^3$, and $N_f = 4096$. Downlink and uplink transmissions are organized into radio frames with a duration of $T_f = (\Delta f_{max} N_f / 100) \cdot T_s = 10$ ms. The radio frame consists of ten subframes each having a section of $T_{sf} = (\Delta f_{max} N_f / 1000) \cdot T_s = 1$ ms. In this case, there may be a set of frames in the uplink and a set of frames in the downlink.

FIG. 5 illustrates a relation between a UL frame and a DL frame in a wireless communication system to which a method proposed by the disclosure is applicable.

As illustrated in FIG. 5, a UL frame number i for transmission from a user equipment (UE) shall start $T_{TA} = N_{TA} T_s$ before the start of a corresponding downlink frame at the corresponding UE.

Regarding the numerology μ, slots are numbered in increasing order of $n_s^\mu \in \{0, \ldots, N_{subframe}^{slots, \mu} -1\}$ within a subframe, and are numbered in increasing order of $n_{s,f}^\mu \in \{0, \ldots, N_{frame}^{slots, \mu} -1\}$ within a radio frame. One slot consists of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame, \mu}$ per radio frame and the number of slot $N_{slot}^{subframe, \mu}$ per subframe, and Table 3 represents the number of OFDM symbols in an extended CP, the number of slot per radio frame and the number of slot per subframe.

TABLE 2

| | Slot configuration | | | | | |
|---|---|---|---|---|---|---|
| | 0 | | | 1 | | |
| μ | $N_{symb}^\mu$ | $N_{frame}^{slots, \mu}$ | $N_{subframe}^{slots, \mu}$ | $N_{symb}^\mu$ | $N_{frame}^{slots, \mu}$ | $N_{subframe}^{slots, \mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 2220 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 2220 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 6 illustrates an example of a resource grid supported in a wireless communication system to which a method proposed by the disclosure may be applied.

Referring to FIG. 6, a resource grid is composed of $N_{RB}^{\mu} N_{sc}^{RB}$ subcarriers in a frequency domain, each subframe composed of $14 \cdot 2\mu$ OFDM symbols, but the disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

The THz communication system operates using a higher band than the target frequency band (100 GHz or less) of the existing systems (e.g., LTE, 5G) and thus has a different channel environment than the existing systems.

The characteristics of a terahertz (THz) communication environment are described below in detail with reference to FIGS. 7 and 8.

FIG. 7 is a view for describing the propagation characteristics of a terahertz (THz) signal according to various materials.

One major characteristic of the terahertz signal is that there is no or little loss in transmission of materials, such as dielectrics. Referring to FIG. 7, it may be identified that among the optical properties of each material type, plastics or semiconductors have a very low absorption rate.

Absorption coefficient ($\alpha$) is related to the imaginary part k in n+jk of the complex refraction index and may be expressed as Equation 1 below.

$$\alpha = \frac{4\pi k}{\lambda} \qquad \text{[Equation 1]}$$

In Equation 1, $\lambda$ is the wavelength in the free space. Transmission of a signal related to the thickness of a material may be expressed as Equation 2 below.

$$L = e^{-\alpha x} \qquad \text{[Equation 2]}$$

In Equation 2, x means a specific depth from the surface of the material. L means how much loss was incurred based on 1.

As it goes to the higher frequency band, the wavelength of the propagation wave shortens and the resolution of the beam using multiple arrays is enhanced.

FIG. 8 is a view for describing an available bandwidth in a range of 1 terahertz (THz) considering path loss.

The length of a THz pulse may be expressed in femtoseconds (fs) to picoseconds (ps). (a) of FIG. 8 summarizes path attenuation according to the distance in the spectrum up to 1 THz on an outdoor basis. (b) of FIG. 8 illustrates classifications of the bandwidths and center frequency available in the spectrum based on the numerical value (100 dB/km) of path attenuation.

If the length of the THz pulse is set to about 50 ps based on one carrier, it may have a bandwidth of about 20 GHz. If one pulse length is considered as one transmission unit, the gap time is quite long with respect to the framework. From the viewpoint of transmission efficiency, resource transmission for THz beam management may be processed at a time as a transmission resource chunk for beam management, and it may be considered to lengthen the period.

Considering the delay spreading characteristics of terahertz pulses, the time axis delay profile characteristics of signals transmitted in a high frequency band in a wireless communication system are likely to be composed of one or two clusters. Even if composed of two clusters, the difference in power of the second cluster compared to the line of sight (LoS) is likely to be about 30 dB. Further, when using a sharp beam with a narrower beam width compared to the conventional system, if the beam is properly directed at the first angle of arrival (AoA), the second cluster would likely be hardly visible.

Therefore, when the frequency band is higher than 300 GHz, which is the lower limit of the window I, the rank of the corresponding channel will be one or maximally two, and this characteristic becomes more prominent as the frequency increases. That is, the higher frequency band, such as the terahertz band or the millimeter wave band, would have fewer dominant rays.

A method for more efficiently reporting channel state information using a terahertz communication system based on the above-described characteristics is described below in detail.

To increase performance, the terahertz communication system requires more base stations or transmission and reception points (TRPs), as well as a smaller inter-cell distance and/or an inter-TRP distance, as compared with conventional systems. Further, the number of transmission and reception beams per TRP is significantly increased compared to the conventional ones.

One link basically experiences worse loss changes due to, e.g., the movement of the UE and this is why the transmission power for one link may be restricted due to the limitations of THz radiation. Accordingly, to enhance the reliability of communication performed by one UE, a coordinated multiple-point transmission and reception (CoMP) operation needs to be basically performed. A plurality of TRPs may perform operations, such as joint transmission (JT), coordinated scheduling (CS), coordinated beamforming (CB), and dynamic port selection (DPS) by exchanging or utilizing channel state information received from the UE.

In general, as the number of base stations or TRPs increases, the number of links to obtain channel state information increases, and so does the number of times of CSI feedback of channel state information. This leads to an increase in overhead in feedback of channel state information. This is described below with reference to FIG. 9.

FIG. 9 is a view for describing reporting of channel state information when cooperative multi-point transmission/reception (CoMP) is performed in a terahertz environment according to an embodiment of the disclosure.

Referring to FIG. 9, five TRPs (TRP0 to TRP4) are arranged around a UE to support coordinated multiple-point transmission and reception (CoMP).

Given the structure of the channel state information for the NR, the channel state information for supporting coordinated multiple-point transmission and reception (CoMP) for the UE is as follows.

CSI Part 1: (RI0, RI1, RI2, RI3, RO4), (CQI0, CQI1, CQI2, CQI3, CQI4)

CSI Part 2: (PMI0, PMI1, PMI2, PMI3, PMI4), if RI is 4 or more, (CQI0', CQI1', CQI2', CQI3', CQI4') for the second codeword When a plurality of TRPs are arranged for CoMP operation, the amount of feedback is doubled as compared to reporting one channel state information.

As described above, the higher frequency band, such as the terahertz band or the millimeter wave band, tends to have fewer dominant rays. A method of reducing the amount of feedback in reporting a plurality of channel state information using such trait is described in detail below.

Further, the embodiments and/or methods described in the disclosure are differentiated solely for ease of description, and some components in any one method may be replaced, or combined with components of another method.

To reduce the feedback of channel state information, the association between the TRPs or base stations may be used. As an example of the association, a UE having an excellent quality of a specific transmission beam #x for TRP0 has a higher chance of having an excellent transmission beam #y for TRP1.

The association may include an association between a plurality of frequency regions. However, without limitations thereto, the association may encompass associations related to at least one of the cell, beam, panel, or one of other elements of the wireless communication system which serves as a reference capable of identifying or indicating other channel state information from specific channel state information among the plurality of channel state information depending on the communication environment. The plurality of frequency regions may be component carriers (CCs) or bandwidth parts (BWPs).

In the disclosure, for convenience of description, the description focuses primarily on TRP.

If the association feature of the preferred beams between the plurality of TRPs is used, the base station may obtain not only preferred beam information for TRP0 but also preferred beam information for TRP1 even when the UE feeds back only preferred beam information for TRP0.

Although FIG. 10 assumes an environment in which a visible beam (LoS ray) is dominant for all TRPs, a non-visible beam (NLoS ray or reflected ray) may dominate for a specific TRP when a fixed reflector already known exists. Further, although in the above example, the beams of TRP0 and TRP1 are one-to-one associated with each other, a one-to-many relationship may be defined/set.

That is, if the preferred beam for TRP0 is #x, the association information may be configured so that the preferred beam for TRP1 is selected from among only M (M<N) specific beams among all of #y_0 . . . #y_(N−1) beams and reported, and the UE may reduce the amount of feedback information for TRP1 from $\log_2 N$ to $\log_2 M$.

The association is applicable to different panels or beams of the same TRP (or different TRPs). As a specific example, the P-port CSI-RS may be transmitted, with different beams applied in the same TRP, and a request for CSI feedback for the P-port CSI-RS may be sent to the UE.

When the above example is extended and applied, if the precoding matrix indicator (PMI) for the first CSI-RS resource is #x, the association information may be configured so that the PMI for the second CSI-RS resource is chosen from among only #y_0 . . . #y_(M−1) (1≤M≤N).

This type of PMI feedback may be determined to be functionally similar to the PMI codebook subset restriction in the conventional system. The conventional codebook subset restriction is to limit PMI(s), which are not to be used, from the viewpoint of a specific TRP or base station. In contrast, the disclosure differs in that a subset of the codebook for selecting a preferred PMI for another TRP or base station is limited based on a preferred PMI for a specific TRP or base station.

The association may also be applied to a plurality of component carriers (CCs), cells, or bandwidth parts (BWPs) and sub-bands.

Although transmitted in the same TRP, signals may have different preferred beam information if their frequency bands differ. The degree to which the beam or CSI is varied depending on the transmission frequency band may differ depending on the difference in how far the frequency band is and the hardware configuration, such as an antenna.

For example, in the case of transmitting signals in adjacent bands using a multi-band antenna, the beams or CSIs may be identical or similar even when the Ccs or BWPs or cells are different. Conversely, when hardware, such as an antenna, an amplifier, and a phase shifter for each band is independently implemented, or when the difference in frequency band is too large, the association between the beams or CSIs is significantly reduced.

When the association is applied to a plurality of CCs or BWPs or cells, it is possible to previously associate beam Ids (or PMIs, CRIs, or SRIs) preferred for other Ccs or BWPs or cells depending on the beam ID (or precoding matrix indicator, CSI-RS resource indicator, or scheduling request indicator) preferred for a specific CC, BWP, or cell.

When the number of candidate beams per CC or BWP or cell is N, the UE that has received the association information selects and reports the beam for the first CC, BWP, or cell from among a total of N beams but, for the beam for the second CC or BWP or cell, the UE selects from among M beam Id(s) associated with the beam ID (or precoding matrix indicator, CSI-RS resource indicator, or scheduling request indicator) preferred for the first CC, BWP, or cell, and reports it, thereby reducing the amount of feedback information.

According to QCL type D (Quasi Co-Located Type D), whether to apply the same/similar (analog) beam between different BWPs or Ccs may be set with the spatial QCL information between the SSBs/CSI-RS resources transmitted in different BWPs or Ccs, but this is a kind of ON or OFF information. Therefore, the conventional wireless communication system fails to provide a means of reducing the amount of information consumed for reporting by providing one-to-many association information between downlink reference signals transmitted through different BWPs or CCs. The NR system does not provide a means for reducing the amount of CSI feedback information by providing CSI association information such as PMI between different BWPs or Ccs, either.

Embodiment 1

The base station may configure or indicate, in/to the UE, association information between the CSI for a specific TRP and CSI or beam report information for another TRP.

When reporting channel state information (CSI) for the plurality of TRPs, the UE may reduce the amount of feedback by using the association information.

When the UE reports the channel state information, it is possible to identify which TRP the channel state information reporting is about by using the reporting settings included in the CSI request. That is, upon obtaining the CSI request through a resource according to the reporting settings configured by a specific TRP among the plurality of TRPs, the UE may be aware that it needs to report channel state information for the specific TRP. The reporting setting may indicate a resource set or resource setting for reporting channel state information.

Embodiment 1 may be association information between different reporting settings. A reporting of channel state information (or beam) for each TRP may be configured independently. In this case, if embodiment 1 is applied, the base station may configure association information for a plurality of specific reporting settings. When the association information is configured, the UE may select and report a beam or a precoding matrix indicator from among only the associated beams or precoding matrix indicators according to the association information.

The UE may report a plurality of related reporting settings using independent uplink physical resources (e.g., PUCCH, PUSCH) or report them together through separated or joint encoding on one uplink physical resource.

The TRP (or Cell or CC or beam or Panel), which serves as the reference for the association information, may be a TRP in which the resource set or resource setting connected to a specific reporting setting when the channel state information is fed back is configured.

According to an embodiment, the TRP serving as the reference for the association information may be a TRP having a highest channel quality indicator (CQI) and a precoding matrix indicator (PMI).

According to an embodiment, the TRP serving as the reference for the association information may be a TRP designated by the serving base station. The TRP may be a TRP in which the resource set or resource setting connected to a reporting setting designated by the serving base station is configured.

According to an embodiment, the TRP serving as the reference for the association information may be listed as follows.

1) A TRP (or Cell or beam or Panel) in which CSI feedback is transmitted through CSI request.

2) A TRP (or Cell or CC or beam or Panel) configured by serving cell.

3) A serving TRP (or Cell or CC or beam or Panel) predesignated by higher layer.

Table 4 below shows example association information between PMI and CQI when the number of TRPs (or BSs or CCs or Beams or Panels) connected to the UE is 5 and there is a one-to-one association based on a specific TRP0 (BS0 or CC0 or Beam0 or Pane0).

TABLE 4

| TRP0 with respect to BS0 or CC0 or Beam0 or Panel0 | TRP1 or BS1 or CC1 or Beam1 or Panel1 | TRP2 or BS2 or CC2 or Beam2 or Panel2 | TRP3 or BS3 or CC3 or Beam3 or Panel3 | TRP4 or BS4 or CC4 or Beam4 or Panel4 |
|---|---|---|---|---|
| PMI0 0 | PMI1 1 | PMI2 5 | PMI3 17 | PMI4 16 |
| PMI1 0 | PMI1 2 | PMI2 8 | PMI3 11 | PMI4 24 |
| ... | ... | ... | ... | ... |
| PMI0 N | PMI1 M | PMI2 18 | PMI3 9 | PMI4 4 |
| CQI0 0 | CQI1 2 | CQI2 4 | CQI3 3 | CQI4 2 |
| CQI0 1 | CQI1 4 | CQI2 7 | CQI3 6 | CQI4 4 |
| ... | ... | ... | ... | ... |
| CQI0 K | CQI1 K+ 4 | CQI2 15 | CQI3 9 | CQI413 |

In Table 4, PMI0 1 means that the PMI for TRP0 (or BS0 or CC0 or Beam0 or Pane0) is 1. When the UE transmits CQI0=1 and PMI0=1 through TRP0 as feedback of channel state information, TRP2 uses a precoder (PMI2 8) having a PMI of 8 and a modulation and coding scheme (MCS) having a CQI of 7 according to the one-to-one association information. In this case, assuming that each rank indicator (RI) is 1 considering the characteristics of the terahertz communication environment, the UE reports channel state information only for TRP0 while omitting a reporting of channel state information for the remaining TRP1 to TRP4.

Embodiment 1-2

The association information may be association information between downlink reference signal resources.

In a specific example where beam selection or reporting is performed by applying a DL beamformed RS, the base station transmits resources configured for the downlink reference signal through different beams, and may then instruct the UE to feed back the preferred downlink reference signal resource. Accordingly, the UE may report using the association between downlink reference signal resources.

The downlink reference signal resource may be a synchronization signal block resource (SSB) resource and/or a CSI-RS resource, and the association between resource IDs may be considered as the association information.

Specifically, the association information may indicate association between CRS-RS resource indicators (CRIs) through CSI-RS in a reporting setting corresponding to the resource set or setting of a specific TRP (or BS or CC or Beam or Panel). In the reporting setting corresponding to the resource set or setting of the specific TRP (BS or CC or Beam or Panel), the association information may be preset by SSB ID or CRI+SSB ID through a synchronization signal block (SSB) or may be set by higher layer configuration (RRC). The CRIs, SSB IDs, and SSB ID CRIs in the reporting setting in each TRP (or BS or CC or Beam or Panel) may be used as association information between reporting settings.

Table 5 below shows example CRI association information when the number of TRPs (or BSs or CCs or Beams or Panels) connected to the UE is 5 and there is a one-to-one association between CRIs based on a specific TRP0 (BS0 or CC0 or Beam0 or Pane0).

TABLE 5

| TRP0 or BS0 or CC0 or Beam0 or Panel0 reference | TRP1 or BS1 or CC1 or Beam1 or Panel1 | TRP2 or BS2 or CC2 or Beam2 or Panel2 | TRP3 or BS3 or CC3 or Beam3 or Panel3 | TRP4 or BS4 or CC4 or Beam4 or Panel4 |
|---|---|---|---|---|
| CRI0 0 | CRI1 2 | CRI2 4 | CRI3 3 | CRI4 2 |
| CRI0 1 | CRI1 4 | CRI2 7 | CRI3 6 | CRI4 4 |
| CRI0 K | CRI1 K-3 | CRI2 15 | CRI3 9 | CRI4 13 |

Table 6 below shows example CRI or SSB ID association information when the number of TRPs (or BSs or CCs or Beams or Panels) connected to the UE is 5 and there is a one-to-one association between CRIs or SSB IDs based on a specific TRP0 (BS0 or CC0 or Beam0 or Pane0).

TABLE 6

| with respect to TRP0 or BS0 or CC0 or Beam or Panel0 | TRP1 or BS1 or CC1 or Beam1 or Panel1 | TRP2 or BS2 or CC2 or Beam2 or Panel2 | TRP3 or BS3 or CC3 or Beam3 or Panel3 | TRP4 or BS4 or CC4 or Beam4 or Panel4 |
|---|---|---|---|---|
| CRI0 0 | SSB ID1 2 | CRI2 4 | SSB ID3 3 | CRI4 2 |
| CRI0 1 | SSB ID1 4 | CRI2 7 | SSB ID3 6 | CRI4 4 |
| CRI0 K | SSB ID1 K-3 | CRI2 15 | SSB ID3 9 | CRI4 13 |

Embodiment 1-3

According to an embodiment, the association information in a one-to-many form may be configured. Specifically, the association between a single PMI and Resource ID in the reporting setting for a specific TRP (or BS or CC or Beam or Panel) and multiple PMIs and Resource IDs for other TRPs (or BSs or CCs or Beams or Panels) may be set.

TABLE 7

| with respect to TRP0 or BS0 or CC0 or Beam0 or Panel0 | TRP1 or BS1 or CC1 or Beam1 or Panel1 | TRP2 or BS2 or CC2 or Beam2 or Panel2 | TRP3 or BS3 or CC3 or Beam3 or Panel3 | TRP4 or BS4 or CC4 or Beam4 or Panel4 |
|---|---|---|---|---|
| PMI0 0 | PMI1 1, PMI1 4 | PMI2 5 PMI2 6 | PMI3 17 PMI3 18 | PMI4 16 PMI3 15 |
| PMI1 0 | PMI1 2 PMI1 3 | PMI2 8 PMI2 9 | PMI3 11 PMI3 12 | PMI4 24 PMI3 25 |
| PMI0 N | PMI1 M PMI1 M + 1 | PMI2 18 PMI2 19 | PMI3 13 PMI3 14 | PMI4 21 PMI4 22 |
| CRI0 0 | CRI1 2 CRI1 3 | CRI2 4 CRI2 5 | CRI4 3 CRI3 1 | CRI4 5 CRI4 6 |
| CRI0 1 | CRI1 4 CRI1 5 | CRI2 7 CRI2 8 | CRI3 6 CRI3 3 | CRI4 4 CRI4 2 |
| CRI0 K | CRI1 K CRI1 6 | CRI2 15 CRI2 6 | CRI3 9 CRI3 17 | CRI4 13 CRI4 7 |

When the UE reports 1 as the PMI value for TRP0, the UE reports a PMI selected from 17 or 18 for TRP3 according to the one-to-many association information between PMIs. If there is a one-to-one association in the above association information, reporting for the remaining TRPs may be omitted, and if there is a one-to-many association, a PMI or CRI may be selected and reported in a reduced range according to the relevant association information. Therefore, the amount of information feedback is reduced.

A reporting of channel state information considering resource association in a terahertz environment is described below in detail.

FIG. 10 is a view for describing reporting of channel state information considering resource association in a terahertz environment in which CoMP is performed according to an embodiment of the disclosure.

Given the association through a resource ID set (a resource ID set according to multiple reporting settings), association information may be preset in the unit of CRI set according to all (N) or some (K, N>K) reporting settings, the SSB ID set of all or some of the reporting settings, or CRI set+SSB ID set or may be set by higher layer (RRC).

Therefore, if the number of resource IDs included in the resource ID set is M, the number of bits of the resource ID is limited to $\lfloor \log_2 M \rfloor$. Alternatively, the serving base station collectively sets the number of resource IDs in the reporting settings having the same resource ID set to K(<M) regardless of the number of resource IDs in the resource ID set or may set the number of bits of the resource ID to $\lfloor \log_2 K \rfloor$. When the UE receives the CSI request and feeds back channel state information, the UE transmits a resource ID having a reduced payload in the reporting setting having the same resource ID set by referring to the corresponding association information.

In the following description, it is assumed that based on TRP0, CRI0 set 3=CRI1 set 1=SSB ID2 set 1=SSB ID3 set 2=CRI4 set 2 may be pre-determined as association information or set by the higher layer.

When the UE feeds back CRI0 set 3 for TRP0, the UE may reduce the amount of feedback according to the association information and report the channel state information. Here, the CSI feedback for TRP0 may mean that CSI feedback composed of reporting settings which denote the resource or resource set transmitted in TRP0 is transmitted from the UE to the base station.

Referring to FIG. 10, the UE may determine that the number of bits of the resource ID for TRP1 associated with CRI0 set 3 is $\log_2 4(=2)$, the number of bits of the resource ID for TRP2 is $\log_2 2(=1)$, TRP3 is 1, and TRP4 is 1. As described above, the UE may transmit channel state information composed of resource IDs having a reduced payload for each TRP.

Table 8 below shows the number of bits of the resource ID per resource ID set of TRP1 associated with respect to TRP0.

TABLE 8

| with respect to Resource ID set in TRP0 | Resource ID set in TRP1 | Resource ID set 의 Resource ID bit 수 in TRP1 |
|---|---|---|
| Resource ID0 set 3 | Resource ID1 set 0 | 1 |
| Resource ID0 set 8 | Resource ID1 set 1 | 3 |
| Resource ID0 set 13 | Resource ID1 set 2 | 4 |
| Resource ID0 set 5 | Resource ID1 set 3 | 2 |

Embodiment 1-5

According to an embodiment, to reduce the amount of feedback of channel state information, it may be configured to have a reduced number of bits of the payload of the PMI. Specifically, the payload of the PMI may be set to K bits (N≥K) smaller than N bits necessary for the resource set or resource in the resource ID set by the higher layer (RRC) or may be predetermined by the base station.

Table 9 below shows the number of bits of PMI per resource ID set with respect to TRP0.

TABLE 9

| Resource ID set in TRP0 reference | Resource ID set in TRP1 | number of PMI bits in Resource ID set |
|---|---|---|
| Resource ID0 set 3 | Resource ID1 set 0 | 5 |
| Resource ID0 set 8 | Resource ID1 set 1 | 3 |
| Resource ID0 set 13 | Resource ID1 set 2 | 6 |
| Resource ID0 set 5 | Resource ID1 set 3 | 10 |

An embodiment of hierarchically reducing the size of the PMI for each reporting setting is described below in detail with reference to FIG. 11.

FIG. 11 is a view for describing a PMI reduction field according to an embodiment of the disclosure.

Embodiment 2

To hierarchically reduce the PMI payload size, the UE may report a PMI reduction field related to information for reduced PMI together with channel state information.

Specifically, upon transmitting the CSI feedback, the UE may transmit the PMI reduction field together, which is information indicating how to reduce the payload size of PMIs in each reporting setting with respect to a specific reporting setting among the reporting settings connected to the resource set or setting for a plurality of CSIs or CSI reporting setting configured for the CoMP operation.

The UE may determine the PMI reduction field with reference to information according to Alt1 to Alt4 below and attach the PMI reduction field to a specific position (e.g., head or tail) of the CSI feedback payload or joint-encode with CSI feedback.

Alt1-L1-RSRP (L1-Reference Signal Received Power), SINR (Signal To Interference Noise Ratio), CQI and/or L1-RSRQ (L1-Reference Signal Received Quality) information of the resources in the resource set or setting connected to each CSI reporting setting.

Alt2-CSI request transmission time information for reporting setting of each CSI (aperiodic reporting)

Alt3-priority information (e.g., reporting setting #1>reporting setting #2, etc.) of a CSI reporting setting preset or set by higher layer (RRC)

Alt4-a combination of the information according to Alt1 to Alt3

The information in the PMI reduction field may include at least one of the following information.
- PMI payload reduction information in each CSI reporting setting (e.g., PMI bit count=4 in CSI reporting setting #1, PMI bit count=3 in CSI reporting setting #2, etc.)
- Information indicating PMI size comparison in each CSI reporting setting (e.g., codepoint 0 when the number of PMI bits in CSI reporting setting #1 is greater than the number of PMI bits in CSI reporting setting #2)
- Resource setting ID as a reference When only the comparison information for the PMI size is included in the PMI reduction field, the payload length of the PMI in the CSI reporting setting may be set with a higher layer by the base station.

As a specific example, for the UE performing the CoMP operation for three TRPs, the number of PMI bits in the first reporting setting is set to 5 by the higher layer, the number of PMI bits in the second reporting setting is set to 3 by the higher layer, and the number of PMI bits in the third reporting setting is set to 1 by the higher layer. The base station may determine the PMI size in each reporting setting according to the received PMI size comparison information.

Table 10 below shows an example hierarchical PMI size setting for a plurality of reporting settings.

TABLE 10

| Number of reporting settings for CoMP operation | Number of PMI bits in each reporting setting |
|---|---|
| 2 | First = 10 bits, Second = 8 bits |
| 3 | First = 12 bits, Second = 10 bits, third = 8 bits |
| 4 | First = 12 bits, Second = 10 bits third = 8 bits , fourth = 6 bits |

The reference for setting the association information in which the payload size of the PMI is hierarchically decreased as described above may be a reporting setting having a resource ID or PMI with the longest payload or a reporting setting indicated through a CSI request of the base station.

Referring to FIG. 11, the channel state information according to three CSI reporting settings (#2 to #4) for the CoMP operation may include the PMI reduced according to association information, and is transmitted together with the PMI reduction field. The PMI reduction field is located at the head of the channel state information (#2 to #4), and may include information (S2, S3, S4) for the PMI reduced in each channel state information (#2 to #4).

Table 11 below shows an example PMI reduction field including PMI size comparison information.

TABLE 11

| | |
|---|---|
| 001 | CSI reporting setting #2 > CSI reporting setting #4 > CSI reporting setting #3 |
| 111 | CSI reporting setting #4 > CSI reporting setting #3 > CSI reporting setting #2 |

According to Table 11, when the value of the PMI reduction field is 001, the PMI according to CSI reporting setting #2 is the largest and the PMI according to #3 is the smallest.

Embodiment 3

When the channel state information is transmitted to the base station, the number of PMIs or PMI bits of the reporting setting associated with the resource setting is limited according to the association information with other TRP (or BS or CC or Beam or Panel) or the number of PMIs or number of PMI bits in the reporting setting associated with the resource set may be limited. A specific value of the limited number of PMIs or number of PMI bits may be set by the higher layer (RRC).

If the channel state information is fed back via the resource setting linked to the resource setting ID (ID0 8) with respect to TRP0 in Table 12 below, the ID of the resource setting related to TRP1 is determined as ID1 1, and the base station may limit the number of PMI bits of the resource setting to three. In another example, the number of PMI bits in the resource set in the case of Table 13 may be limited to two.

Table 12 below shows the number of PMI bits per resource setting with respect to TRP0, and Table 13 shows the number of PMI bits per resource set with respect to TRP0.

TABLE 12

| with respect to Resource setting ID in TRP0 | Resource setting ID in TRP1 | number of PMI bits per resource setting |
|---|---|---|
| Resource setting ID0 3 | Resource setting ID1 0 | 1 |
| Resource setting ID0 8 | Resource setting ID1 1 | 3 |
| Resource setting ID0 13 | Resource setting ID1 2 | 4 |
| Resource setting ID0 5 | Resource setting ID1 3 | 2 |

TABLE 13

| Resource set ID in Target TRP0 | Resource set ID in TRP1 | number of PMI bits per resource set |
|---|---|---|
| Resource set ID0 3 | Resource set ID1 0 | 1 |
| Resource set ID0 8 | Resource set ID1 1 | 2 |
| Resource set ID0 13 | Resource set ID1 2 | 4 |
| Resource set ID0 5 | Resource set ID1 3 | 3 |

Association information determined according to the association state is described below in detail with reference to FIG. 12.

FIG. 12 is a view illustrating a method of reporting channel state information considering an association state according to an embodiment of the disclosure.

Embodiment 4

The association information may be determined according to a preset association state. This is to reduce the amount of information and dynamic selection of association information. Specifically, the association state for reducing PMIs, resource ID, and/or CQI of the associated reporting setting per TRP (or BS or CC or Beam or Panel) may be preset or may be set by the higher layer (RRC).

Example PMI and CQI values according to the association state of TRP0, which is the reference, are summarized in Tables 14 and 15 below. Table 14 illustrates a case in which the association state of TRP0 is 0, and Table 15 illustrates a case in which the association state of TRP0 is 1.

TABLE 14

| with respect to TRP0 or BS0 or CC0 or Beam0 or Panel0 Association state 0 | TRP1 or BS1 or CC1 or Beam1 or Panel1 | TRP2 or BS2 or CC2 or Beam2 or Panel2 | TRP3 or BS3 or CC3 or Beam3 or Panel3 | TRP4 or BS4 or CC4 or Beam4 or Panel4 |
|---|---|---|---|---|
| PMI0 0 | PMI1 1 | PMI2 5 | PMI3 17 | PMI4 16 |
| PMI0 1 | PMI1 2 | PMI2 8 | PMI3 11 | PMI4 24 |
| PMI0 N0 | PMI1 M | PMI2 18 | PMI3 9 | PMI4 4 |
| CQI0 0 | CQI1 2 | CQI2 4 | CQI3 3 | CQI4 2 |
| CQI0 1 | CQI1 4 | CQI2 7 | CQI3 6 | CQI4 4 |
| CQI0 K0 | CQI1 K + 4 | CQI2 15 | CQI3 9 | CQI4 13 |

TABLE 15

| with respect to TRP0 or BS0 or CC0 or Beam0 or Panel0 Association state 1 | TRP1 or BS1 or CC1 or Beam1 or Panel1 | TRP2 or BS2 or CC2 or Beam2 or Panel2 | TRP3 or BS3 or CC3 or Beam3 or Panel3 | TRP4 or BS4 or CC4 or Beam4 or Panel4 |
|---|---|---|---|---|
| PMI0 0 | PMI1 3 | PMI2 11 | PMI3 12 | PMI4 16 |
| PMI0 1 | PMI1 4 | PMI2 16 | PMI3 5 | PMI4 24 |
| PMI0 N1 | PMI1 M | PMI2 3 | PMI3 21 | PMI4 4 |
| CQI0 0 | CQI1 4 | CQI2 4 | CQI3 3 | CQI4 2 |
| CQI0 1 | CQI1 5 | CQI2 7 | CQI3 6 | CQI4 4 |
| CQI0 K1 | CQI1 K-2 | CQI2 15 | CQI3 9 | CQI4 13 |

Referring to FIG. 12, as the association state, there may be an association state when TRP0 is set as the reference, and there may be an association state when TRP2 is set as the reference. It is assumed that TRP0 is the reference and the association state is 1 (association state 1). According to Table 15, if the PMI value of TRP0 is 1 and the CQI value is 0, the PMI value of TRP2 is 16 and the CQI is 4.

Embodiment 4-1

The base station may set the association state UE-specifically using information for the UE. Specifically, the base station may UE-specifically set the association state through the higher layer (RRC) or downlink control information (DCI) using, e.g., the location information for the UE (aperiodic CSI request).

The UE may report channel state information using the association state according to, e.g., current location information among a plurality of association states set by the base station. Specifically, the UE may feed back the best PMI, resource ID and/or CQI among the PMIs, resource IDs, and/or CQIs corresponding to the association state according to, e.g., the current location information.

Embodiment 4-2

The association information may include connection information between the association state as a reference and the association state of another reporting setting. Specifically, the association state of the reporting setting as a reference may be connected with the association state of the reporting setting of another TRP (or BS or CC or Beam or Panel) through the association information. The connection information may be set in advance or may be set by the higher layer (RRC).

Table 16 below shows example connection information for an association state between base stations.

TABLE 16

| BS 0-based association state 0 | BS1 association state 0 | BS2 association state 4 | BS3 association state 8 | BS4 association state 11 |
|---|---|---|---|---|
| BS 0-based association state L | BS1 association state L1 | BS2 association state L2 | BS3 association state L3 | BS4 association state L4 |

Referring to Table 16, association state 0 of base station 0 (BS0) is connected to association state 11 of base station 4 (BS4). When the UE reports channel state information to base station 4, if the PMI according to association state 11 of base station 4 has a better CQI than the CQI of the PMI according to association state 0 of base station 0, the UE may transmit the PMI and CQI according to association state 11 of base station 4.

Embodiment 5

For the UE connected to N TRPs (or cells), a joint PMI may be set for the TRP (or cell). The joint PMI is applicable to i1 (wideband PMI) or is also applicable to i1+i2 (subband PMI). In the case of a dual codebook, a PMI for W1 may be jointly configured, or a PMI for W1+W2 may be jointly configured.

Table 17 below shows an example joint PMI when 5 TRPs are connected to the UE.

TABLE 17

| Joint PMI | TRP0 | TRP1 | TRP2 | TRP3 | TRP4 |
|---|---|---|---|---|---|
| 000 | PMI0 2 | PMI1 3 | PMI2 4 | PMI1 3 | PMI4 10 |
| 001 | PMI0 6 | PMI1 0 | PMI2 2 | PMI3 3 | PMI4 4 |
| 111 | PMI0 3 | PMI1 12 | PMI2 8 | PMI3 6 | PMI4 15 |

When the PMI of each TRP is not included in the code point of the joint PMI, the UE may or may not transmit the PMI of the corresponding TRP.

Embodiment 5-1

According to an embodiment, the association information may include information related to codebook restriction. Specifically, the association information may include information related to a codebook subset restriction between the TRP (or BS or CC or Beam or Panel), as the reference, and another TRP (or BS or CC or Beam or Panel). The corresponding information may be set by the higher layer (RRC). The codebook subset restriction information included in the association information may be determined as a bitmap or a f (target PMI) function.

According to embodiment 5-2, the codebook subset of the PMI selected in reporting another CSI may be limited according to the PMI selected in reporting a specific CSI.

Specifically, when a PMI is selected or reported using a plurality of downlink reference signal ports (DL RS ports) (applying the same beam), the PMI selected in the related CSI reporting according to the association information restricts the PMI codebook subset to be selected in other CSI reporting. That is, the subset of the restricted PMI codebook is dependent on the PMI selected for reporting the CSI as a reference.

Table 18 below represents the codebook subset restriction of other TRPs as a bitmap when the number of PMIs of TRP0 is 8.

TABLE 18

| PMI for TRP0 as reference | TRP1 codebook subset restriction bitmap | TRP2 codebook subset restriction bitmap | TRP3 codebook subset restriction bitmap | TRP4 codebook subset restriction bitmap |
|---|---|---|---|---|
| 000 | 11110000 | 00011110 | 00000011 | 00001111 |
| 001 | 00000011 | 01111000 | 11011000 | 00011110 |
| 111 | 00011110 | 10101010 | 01101100 | 11110000 |

The codebook subset restriction may be implicitly set using Equations 3 and 4 below.

Specifically, the starting position of 1 for the codebook subset restriction may be defined as in Equation 3 below.

$$F(n) = (M+n+k) \bmod Tn + 1 \quad \text{[Equation 3]}$$

In Equation 3, n is the PMI of the reference TRP (target TRP), k is the ID representing each TRP, M is the number of PMIs set in the reference TRP, and Tn is the number of TRPs set in the UE.

The number of consecutive 1s for the codebook subset restriction may be defined as in Equation 4 below.

$$F'(n) = \left\lceil \frac{M}{n \bmod 2 + 2} \right\rceil \quad \text{[Equation 4]}$$

When the number of TRPs set in the UE for the CoMP operation is 5 and the number of PMIs set in TRP0 as the reference is 8, the codebook subset of each TRP may be expressed as in Table 19 below.

TABLE 19

| PMI for TRP0 as reference | TRP1 PMI | TRP2 PMI | TRP3 PMI | TRP4 PMI |
|---|---|---|---|---|
| 000 | 00001111 | 11110000 | 01111000 | 00111100 |
| 001 | 11100000 | 01110000 | 00111000 | 00011100 |
| 111 | 01110000 | 00111000 | 00011100 | 00001110 |

Embodiment 5-2

For each reporting setting of each TRP (or BS or CC or Beam or Panel) set in the UE for the CoMP operation, L (the number of columns of W1), which is the number of selective beams, may be set by the higher layer.

In the case of a dual codebook, the number of columns of W1 may be set by the higher layer. Or the number of selective beams in the reporting setting of the TRP (or BS or CC or Beam or Panel), which is a reference from the UE point of view, is L, and the number of selective beams for the remaining TRPs (or BSs or CCs or Beams or Panels) may be set to K (L>K).

The above-described embodiments of the disclosure may be applied to other 5G systems (e.g., UTRA) than 3GPP LTE systems, as well as beyond-5G systems and their candidate techniques.

The above-described embodiments are described below in greater detail in terms of a method of reporting a plurality of channel states.

FIG. 13 is a flowchart illustrating a method for a terminal to report a plurality of channel state information according to an embodiment of the disclosure.

Referring to FIG. 13, according to an embodiment of the disclosure, a method for reporting a plurality of channel state information in a wireless communication system may include an association information reception step S1310 and a multiple-channel state information reporting step S1320.

According to an embodiment, the wireless communication system may be a system operating in a terahertz communication environment.

Specifically, the wireless communication system operates in a specific frequency band. A lower limit of the specific frequency band may be greater than or equal to 100 GHz. Alternatively, the lower limit may be 300 GHz or more considering the channel characteristics in which the number of available bandwidths and ranks considering path loss is 1 or 2. Since the number of dominant beams decreases in a specific frequency band, association information for reporting a plurality of channel state information may be effectively utilized.

In S1310, the UE receives association information related to a plurality of channel state reports.

According to an embodiment, the plurality of channel state information may be channel state information for a plurality of base stations included in a coordinated multiple-point transmission and reception (CoMP) set to perform CoMP or channel state information for a plurality of frequency regions.

According to an embodiment, the association information may include information indicating channel state information for remaining base stations according to channel state information for a specific base station among the plurality of base stations included in the CoMP set. In this case, the UE may receive the association information from at least any one of the plurality of base stations included in the CoMP set.

According to an embodiment, the specific base station may be any one of a base station transmitting a message for sending a request for channel state information to the UE, a base station set by RRC signaling, or a base station having a highest channel quality indicator (CQI) value among the plurality of base stations.

According to an embodiment, the association information may include information indicating channel state information for remaining frequency regions according to channel state information for a specific frequency region among the plurality of frequency regions. The frequency regions may be component carriers (CCs) or bandwidth parts (BWPs).

According to an embodiment, the association information may indicate an association state determined according to UE-specific information including location information for the UE among preset association states. The determined association state may include information indicating a mapping relationship between information included in the specific channel state information and information included in the remaining channel state information.

In S1320, the UE reports a plurality of channel state information using the association information. The UE may exclude remaining channel state information except for specific channel state information among the plurality of channel state information from being reported or report the same in a form of a reduced payload size, according to the association information.

According to an embodiment, when the channel state information for the specific base station and the channel state information for the remaining base stations are associated one-to-one in the association information, the UE may exclude the channel state information for the remaining base stations from the reporting, and otherwise, the UE may report the channel state information for the remaining base stations in a form having a reduced payload size according to the association information.

According to an embodiment, in the channel state information for the remaining base stations, at least one of a CSI-RS resource indicator (CRI) or a precoding matrix indicator (PMI) may have a reduced payload size according to the association information.

According to an embodiment, the payload size of the CRI included in the channel state information for the remaining base stations may be determined according to the number of resources associated with the CSI-RS resource for measuring the channel state information for the specific base station.

Specifically, the payload size of the CRI may be determined according to a number of resources associated with CSI-RS resources for measuring the channel state information for the specific base station among CSI-RS resources for measuring the channel state information for the remaining base stations.

Therefore, since the value is indicated in the range of the CSI-RS resource associated with the CSI-RS resource of the specific base station rather than the entire range of the CSI-RS resource set in each base station, the number of CRI bits decreases.

According to an embodiment, the association information may indicate a restriction on the PMI codebook subset for each base station, and the payload size of the PMI of each base station may be determined by reflecting the codebook subset restriction.

Specifically, the payload size of the PMI included in the channel state information for the remaining base stations may be determined by the number of the remaining precoding matrices except for the precoding matrices whose use is limited by the PMI included in the channel state information for the specific base station among the precoding matrices in the codebook.

According to an embodiment, when the association information indicates the channel state information for the remaining frequency regions according to the channel state information for the specific frequency region among the plurality of frequency regions, the UE may report the channel state information as follows.

When the channel state information for the specific frequency region and the channel state information for the remaining frequency regions are associated one-to-one according to the association information, the UE may exclude the channel state information for the remaining frequency regions from the reporting, and otherwise, the UE may report the channel state information for the remaining frequency regions in a form having a reduced payload size according to the association information.

In an implementational aspect, the operations of the UE described above may be specifically implemented by the UE 1520 or 1620 shown in FIGS. 15 and 16 of the disclosure. For example, the above-described UE operations may be performed by the processors 1521 and 1621 and/or the radio frequency (RF) units (or modules) 1523 and 1625.

For example, the processor may receive association information related to a plurality of channel state reports. The processor may report a plurality of channel state information according to the association information. The processor may be configured to exclude remaining channel state information except for specific channel state information among the plurality of channel state information or report the same in a form of a reduced payload size, according to the association information.

The above-described embodiments are described below in greater detail in terms of a method of receiving a plurality of channel states.

FIG. 14 is a flowchart illustrating a method for a base station to receive a plurality of channel state information according to another embodiment of the disclosure.

Referring to FIG. 14, according to another embodiment of the disclosure, a method for receiving a plurality of channel state information by a base station in a wireless communication system may include an association information transmission step S1410 and a multiple-channel information reception step S1420.

In S1410, the base station sets association information related to a plurality of channel state information and transmits it to a UE.

According to an embodiment, the base station may be one of a plurality of base stations configured in the UE to perform coordinated multiple-point transmission and reception (CoMP).

According to an embodiment, the plurality of channel state information may be channel state information for a plurality of base stations included in a CoMP or channel state information for a plurality of frequency regions.

According to an embodiment, the association information may include information indicating channel state information for remaining base stations according to channel state information for a specific base station among the plurality of base stations included in the CoMP set.

According to an embodiment, the specific base station may be any one of a base station transmitting a message for sending a request for channel state information to the UE, a base station set by RRC signaling, or a base station having a highest channel quality indicator (CQI) value among the plurality of base stations.

According to an embodiment, the association information may include information indicating channel state information for remaining frequency regions according to channel state information for a specific frequency region among the plurality of frequency regions. The frequency regions may be component carriers (CCs) or bandwidth parts (BWPs).

According to an embodiment, the association information may indicate an association state determined according to UE-specific information including location information for the UE among preset association states. The determined association state may include information indicating a mapping relationship between information included in the specific channel state information and information included in the remaining channel state information.

In S1420, the processor may receive a plurality of channel state information according to the association information from the UE. The base station may exclude remaining channel state information except for specific channel state information among the plurality of channel state information or receive the same in a form of a reduced payload size, according to the association information.

According to an embodiment, when the channel state information for the specific base station and the channel state information for the remaining base stations are associated one-to-one in the association information, the base station may receive channel state information except for the channel state information for the remaining base stations, and otherwise, the base station may receive the channel state information for the remaining base stations in a form having a reduced payload size according to the association information.

According to an embodiment, in the channel state information for the remaining base stations, at least one of a CSI-RS resource indicator (CRI) or a precoding matrix indicator (PMI) may have a reduced payload size according to the association information.

According to an embodiment, the payload size of the CRI included in the channel state information for the remaining base stations may be determined according to the number of resources associated with the CSI-RS resource for measuring the channel state information for the specific base station.

Specifically, the payload size of the CRI may be determined according to a number of resources associated with CSI-RS resources for measuring the channel state information for the specific base station among CSI-RS resources for measuring the channel state information for the remaining base stations.

Therefore, since the value is indicated in the range of the CSI-RS resource associated with the CSI-RS resource of the specific base station rather than the entire range of the CSI-RS resource set in each base station, the number of CRI bits decreases.

According to an embodiment, the association information may indicate a restriction on the PMI codebook subset for each base station, and the payload size of the PMI of each base station may be determined by reflecting the codebook subset restriction.

Specifically, the payload size of the PMI included in the channel state information for the remaining base stations may be determined by the number of the remaining precoding matrices except for the precoding matrices whose use is limited by the PMI included in the channel state information for the specific base station among the precoding matrices in the codebook.

According to an embodiment, when the association information indicates the channel state information for the remaining frequency regions according to the channel state information for the specific frequency region among the plurality of frequency regions, the base station may receive the channel state information as follows.

When the channel state information for the specific frequency region and the channel state information for the remaining frequency regions are one-to-one associated with each other according to the association information, the base station may receive the channel state information, with the channel state information for the remaining frequency regions excluded.

Unless the channel state information for the specific frequency region and the channel state information for the remaining frequency regions are associated one-to-one, the base station may receive the channel state information for the remaining frequency regions in the form of having a reduced payload size according to the association information.

In an implementational aspect, the operations of the base station described above may be specifically implemented by the base station 1510 or 1610 shown in FIGS. 15 and 16 of the disclosure. For example, the above-described UE operations may be performed by the processors 1511 and 1611 and/or the radio frequency (RF) units (or modules) 1513 and 1615.

For example, the processor may set receive association information related to a plurality of channel state reports and transmit the same to a UE. The processor may receive a plurality of channel state information according to the association information. The processor may be configured to exclude remaining channel state information except for specific channel state information from reception among the plurality of channel state information or receive the same in a form of a reduced payload size, according to the association information.

As described above, the disclosure configures association information between channel state information considering the channel characteristics of a high frequency band. The remaining channel state information except for the specific channel state information serving as a reference among a plurality of channel state information may be excluded from the report using the association information. Therefore, it is possible to more effectively report channel state information in a terahertz communication environment with a small number of dominant rays.

Further, the disclosure may partially exclude the reporting of channel state information, or report the channel state information, with the payload size reduced, using the association between a plurality of base stations or the association between a plurality of frequency regions for performing coordinated multiple-point transmission and reception (CoMP). Therefore, it is possible to provide various association information that may reduce feedback of channel state information according to a communication environment.

Devices to which the Disclosure may Apply

FIG. 15 is a view illustrating a wireless communication device to which the methods proposed in the present specification may be applied according to another embodiment of the disclosure.

Referring to FIG. 15, the wireless communication system may include a first device 1510 and a plurality of second devices 1520 located in an area of the first device 1510.

According to an embodiment, the first device 1510 may be a base station, and the second device 1520 may be a UE, and each may be represented as a wireless device.

The base station 1510 includes a processor 1511, a memory 1512, and a transceiver 1513. The processor 1511 implements the functions, processes or steps, and/or methods proposed above in connection with FIGS. 1 to 13. Wireless interface protocol layers may be implemented by the processor. The memory 1512 is connected with the processor and stores various pieces of information for driving the processor. The transceiver 1513 is connected with the processor to transmit and/or receive wireless signals. Specifically, the transceiver 1513 may include a transmitter that transmits radio signals and a receiver that receives radio signals.

The UE 1520 includes a processor 1521, a memory 1522, and a transceiver 1523.

The processor 1521 implements the functions, processes or steps, and/or methods proposed above in connection with FIGS. 1 to 13. Wireless interface protocol layers may be implemented by the processor. The memory 1522 is connected with the processor and stores various pieces of information for driving the processor. The transceiver 1523 is connected with the processor to transmit and/or receive wireless signals. Specifically, the transceiver 1523 may include a transmitter that transmits radio signals and a receiver that receives radio signals.

The memory 1512 and 1522 may be positioned inside or outside the processor 1511 and 1521 and be connected with the processor 1511 and 1521 via various known means.

The base station 1510 and/or the UE 1520 may include a single or multiple antennas.

The first device 1510 and the second device 1520 according to another embodiment are described.

The first device 1510 may be a base station, a network node, a transmission terminal, a reception terminal, a radio device, a wireless communication device, a vehicle, an autonomous vehicle, a connected car, an unmanned aerial vehicle (UAV) or drone, an artificial intelligence (AI) module, a robot, an augmented reality (AR) device, a virtual reality (VR) device, a mixed reality (MR) device, a hologram device, a public safety device, an MTC device, an IoT device, a medical device, a fintech device (or financial device), a security device, a weather/environment device, or a device related to fourth industrial revolution or 5G service.

The second device 1520 may be a base station, a network node, a transmission terminal, a reception terminal, a radio device, a wireless communication device, a vehicle, an autonomous vehicle, a connected car, an unmanned aerial vehicle (UAV) or drone, an artificial intelligence (AI) module, a robot, an augmented reality (AR) device, a virtual reality (VR) device, a mixed reality (MR) device, a hologram device, a public safety device, an MTC device, an IoT device, a medical device, a fintech device (or financial device), a security device, a weather/environment device, or a device related to fourth industrial revolution or 5G service.

For example, the UE may include a mobile phone, a smart phone, a laptop computer, a digital broadcasting terminal, a personal digital assistants (PDA), a portable multimedia player (PMP), a navigation system, a slate PC, a tablet PC, an Ultrabook, a wearable device, for example, a watch-type terminal (smartwatch), a glass-type terminal (smart glass), or head mounted display (HMD). For example, the HMD may be a display device worn on the head. For example, HMD may be used to implement VR, AR or MR.

For example, the drone may be an unmanned aerial vehicle that may be flown by wireless control signals. For example, the VR device may include a device that implements virtual-world objects or background. For example, the AR device may include a device that connects and implements virtual-world objects or background on real-world objects or background. For example, the MR device may include a device that combines and implements virtual-world objects or background with real-world objects or background. For example, the hologram device may include a device that implements a 360-degree stereoscopic image by recording and reproducing stereoscopic information by utilizing a light interference phenomenon (so-called holography) that occurs when two laser beams meet. For example, the public safety device may include an image relay device or an image device wearable on a user's body. For example, the MTC device and the IoT device may be devices that do not require direct human intervention or manipulation. For example, the MTC device and the IoT device may include a smart meter, a bending machine, a thermometer, a smart light bulb, a door lock, or various sensors. For example, the medical device may be a device used for the purpose of diagnosing, treating, alleviating, treating or preventing a disease. For example, the medical device may be a device used for the purpose of diagnosing, treating, alleviating or correcting an injury or disorder. For example, the medical device may be a device used for the purpose of examining, replacing or modifying a structure or function. For example, the medical device may be a device used for the purpose of controlling pregnancy. For example, the medical device may include a device for treatment, a device for surgery, a device for (in-vitro) diagnosis, a hearing aid or a device for procedure. For example, the security device may be a device installed to prevent possible hazards and maintain safety. For example, the security device may be a camera, CCTV, recorder, or black box. For example, the fintech device may be a device capable of providing financial services such as mobile payment. For example, the fintech device may include a payment device or a point-of-sales (POS) device. For example, the weather/environment device may include a device that monitors or predicts the weather/environment.

The first device 1510 may include at least one or more processors, such as the processor 1511, at least one or more memories, such as the memory 1512, and at least one or more transceivers, such as the transceiver 1513. The processor 1511 may perform the functions, procedures, and/or methods described above. The processor 1511 may perform one or more protocols. For example, the processor 1511 may perform one or more layers of the air interface protocol. The memory 1512 may be connected to the processor 1511 and may store various types of information and/or commands.

The transceiver 1513 may be connected to the processor 1511 and be controlled to transmit and receive wireless signals.

The second device 1520 may include at least one processor, such as the processor 1521, at least one memory device, such as the memory 1522, and at least one transceiver, such as the transceiver 1523. The processor 1521 may perform the functions, procedures, and/or methods described above. The processor 1521 may implement one or more protocols. For example, the processor 1521 may implement one or more layers of the air interface protocol. The memory 1522 may be connected to the processor 1521 and may store various types of information and/or commands The transceiver 1523 may be connected to the processor 1521 and be controlled to transmit and receive wireless signals.

The memory 1512 and/or the memory 1522 may be connected inside or outside the processor 1511 and/or the processor 1521 or may be connected to other processors through various technologies such as wired or wireless connection.

The first device 1510 and/or the second device 1520 may have one or more antennas. For example, the antenna 1514 and/or the antenna 1524 may be configured to transmit and receive wireless signals.

FIG. 16 is a block diagram illustrating another example configuration of a wireless communication device to which methods proposed according to the disclosure are applicable.

Referring to FIG. 16, the wireless communication system includes a base station 1610 and a plurality of UEs 1620 located in the area of the base station. The base station may be expressed as a transmitter, and the UE may be expressed as a receiver, and vice versa. The base station and UE include processors 1611 and 1621, memories 1614 and 1624, one or more Tx/Rx radio frequency (RF) modules 1615 and 1625, Tx processors 1612 and 1622, Rx processors 1613 and 1623, and antennas 1616 and 1626. The processor implements the above-described functions, processes, and/or methods. Specifically, on DL (communication from the base station to the UE), higher layer packets are provided from a core network to the processor 1611. The processor implements L2 layer functions. On DL, the processor is in charge of multiplexing between the logical channel and transport channel, radio resource allocation for the UE, and signaling to the UE. The Tx processor 1612 implements various signal processing functions on the L1 layer (i.e., the physical layer). The signal processing functions allow for easier forward error correction (FEC) in the UE and include coding and interleaving. Coded and modulated symbols are split into parallel streams, and each stream is mapped to an OFDM subcarrier, is multiplexed with a reference signal (RS) in the time and/or frequency domain, and they are then merged together by inverse fast Fourier transform (IFFT), thereby generating a physical channel for carrying time domain OFDMA symbol streams. The OFDM streams are spatially precoded to generate multiple spatial streams. Each spatial stream may be provided to a different antenna 1616 via an individual Tx/Rx module (or transceiver 1615). Each Tx/Rx module may modulate the RF carrier into each spatial stream for transmission. In the UE, each Tx/Rx module (or transceiver 1625) receives signals via its respective antenna 1626. Each Tx/Rx module reconstructs the information modulated with the RF carrier and provides the reconstructed signal or information to the Rx processor 1623. The Rx processor implements various signal processing functions of layer 1. The Rx processor may perform spatial processing on the information for reconstructing any spatial stream travelling to the UE. Where multiple spatial streams travel to the UE, they may be merged into a single OFDMA symbol stream by multiple Rx processors. The Rx processor transforms the OFDMA symbol stream from the time domain to frequency domain using fast Fourier transform (FFT). The frequency domain signal contains an individual OFDMA symbol stream for each subcarrier of the OFDM signal. The reference signal and symbols on each subcarrier are reconstructed and demodulated by determining signal array points that are most probable as transmitted from the baseband signal. Such soft decisions may be based on channel estimations. Soft decisions are decoded and deinterleaved to reconstruct the original data and control signal transmitted by the base station on the physical channel. The data and control signal are provided to the processor 1621.

UL (communication from the UE to the base station) is handled by the base station 1610 in a similar manner to those described above in connection with the functions of the receiver in the UE 1620. Each Tx/Rx module 1625 receives signals via its respective antenna 1626. Each Tx/Rx module provides RF carrier and information to the Rx processor 1623. The processor 1621 may be related to the memory 1624 that stores program code and data. The memory may be referred to as a computer readable medium.

In the disclosure, the wireless device may be a base station, a network node, a transmission terminal, a reception terminal, a radio device, a wireless communication device, a vehicle, an autonomous vehicle, an unmanned aerial vehicle (UAV) or drone, an artificial intelligence (AI) module, a robot, an augmented reality (AR) device, a virtual reality (VR) device, an MTC device, an IoT device, a medical device, a fintech device (or financial device), a security device, a weather/environment device, or a device related to fourth industrial revolution or 5G service. For example, the drone may be an unmanned aerial vehicle that may be flown by wireless control signals. For example, the MTC device and IoT device may be devices that need no human involvement or control and may be, e.g., smart meters, vending machines, thermostats, smart bulbs, door locks, or various sensors. For example, the medical device may be a device for diagnosing, treating, mitigating, or preventing disease or a device used for testing, replacing, or transforming the structure or function, and may be, e.g., a piece of equipment for treatment, surgery, (extracorporeal) diagnosis device, hearing aid, or procedure device. For example, the security device may be a device for preventing possible risks and keeping safe, which may include, e.g., a camera, a CCTV, or a blackbox. For example, the fintech device may be a device capable of providing mobile payment or other financial services, which may include, e.g., a payment device or point-of-sales (PoS) device. For example, the weather/environment device may mean a device that monitors and forecasts weather/environment.

In the disclosure, the UE may encompass, e.g., mobile phones, smartphones, laptop computers, digital broadcast terminals, personal digital assistants (PDAs), portable multimedia players (PMPs), navigation, slate PCs, tablet PCs, Ultrabooks, wearable devices (e.g., smartwatches, smart glasses, or head-mounted displays (HMDs), or foldable devices. For example, the HMD, as a display worn on the human's head, may be used to implement virtual reality (VR) or augmented reality (AR).

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and can implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure can be implemented by various means, for example, hardware, firmware, software, or combinations thereof. When embodiments are implemented by hardware, one embodiment of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

The invention claimed is:

1. A method for reporting channel state information by a user equipment (UE) in a wireless communication system, the method comprising:
receiving association information related to a plurality of channel state reports; and
reporting all or a part of a plurality of channel state information associated with a plurality of frequency regions according to the association information including information indicating channel state information for remaining frequency regions according to channel state information for a specific frequency region among the plurality of frequency regions,
wherein, in reporting all or a part of the plurality of channel state information, remaining channel state information except for specific channel state information among the plurality of channel state information is excluded from being reported or is reported in a form of a reduced payload size, according to the association information.

2. The method of claim 1, wherein
the wireless communication system operates in a specific frequency band, and wherein a lower limit of the specific frequency band is greater than or equal to 100 GHz.

3. The method of claim 2, wherein the plurality of channel state information is further associated with a plurality of base stations included in a coordinated multiple-point transmission and reception (CoMP) set to perform CoMP.

4. The method of claim 3, wherein the association information further includes information indicating channel state information for remaining base stations according to channel state information for a specific base station among the plurality of base stations included in the CoMP set.

5. The method of claim 4, wherein, in receiving the association information, the association information is received from at least any one of the plurality of base stations included in the CoMP set,
and wherein, in reporting the plurality of channel state information,
when the channel state information for the specific base station and the channel state information for the remaining base stations are one-to-one associated with each other in the association information, the channel state information for the remaining base stations is excluded from being reported,
and otherwise, the channel state information for the remaining base stations is reported in a form having a reduced payload size according to the association information.

6. The method of claim 5, wherein the specific base station is any one of a base station transmitting a message to request for channel state information to the UE, a base station set by RRC signaling, or a base station having a highest channel quality indicator (CQI) value among the plurality of base stations.

7. The method of claim 6, wherein in the channel state information for the remaining base stations, at least one of a CSI-RS resource indicator (CRI) or a precoding matrix indicator (PMI) has a reduced payload size according to the association information.

8. The method of claim 7, wherein the payload size of the CRI included in the channel state information for the remaining base stations is determined according to a number of resources associated with CSI-RS resources for measuring the channel state information for the specific base station among CSI-RS resources for measuring the channel state information for the remaining base stations.

9. The method of claim 7, wherein the payload size of the PMI included in the channel state information for the remaining base stations is determined by a number of remaining precoding matrices except for precoding matrices, which are limited in use by PMI included in the channel state information for the specific base station, among precoding matrices in a codebook.

10. The method of claim 1, wherein, in reporting the plurality of channel state information,
when the channel state information for the specific frequency region and the channel state information for the remaining frequency regions are one-to-one associated with each other according to the association information, the channel state information for the remaining frequency regions is excluded from being reported,
and otherwise, the channel state information for the remaining frequency regions is reported in a form having a reduced payload size according to the association information.

11. The method of claim 10, wherein the frequency region is a component carrier or a bandwidth part.

12. The method of claim 1, wherein the association information indicates an association state determined according to UE-specific information including location information for the UE among preset association states, and wherein the determined association state includes information indicating a mapping relationship between information included in the specific channel state information and information included in the remaining channel state information.

13. A user equipment (UE) reporting a plurality of channel state information in a wireless communication system, the UE comprising:
a transceiver transmitting/receiving a radio signal;
a memory; and
a processor connected with the transceiver and the memory,
wherein the processor:
receives association information related to a plurality of channel state reports; and
reports all or a part of a plurality of channel state information associated with a plurality of frequency regions according to the association information including information indicating channel state information for remaining frequency regions according to channel state information for a specific frequency region among the plurality of frequency regions, and
wherein, in reporting all or a part of the plurality of channel state information, remaining channel state information except for specific channel state information among the plurality of channel state information is configured to be excluded from being reported or to be reported in a form of a reduced payload size, according to the association information.

14. A device reporting a plurality of channel states in a wireless communication system, the device comprising:
a memory; and a processor connected with the memory, wherein the processor,
receives association information related to a plurality of channel state reports; and
reports all or a part of a plurality of channel state information associated with a plurality of frequency regions according to the association information including information indicating channel state information for remaining frequency regions according to channel state information for a specific frequency region among the plurality of frequency regions, and
wherein, in reporting all or a part of the plurality of channel state information, remaining channel state information except for specific channel state information among the plurality of channel state information is not reported or is reported in a form of a reduced payload size, according to the association information.

* * * * *